(12) United States Patent
Coxe et al.

(10) Patent No.: US 10,142,320 B2
(45) Date of Patent: Nov. 27, 2018

(54) SYSTEM AND METHOD FOR ESTABLISHING AND MONETIZING TRUSTED IDENTITIES IN CYBERSPACE WITH PERSONAL DATA SERVICE AND USER CONSOLE

(71) Applicant: ID DATAWEB, INC., Vienna, VA (US)

(72) Inventors: David Hemphill Coxe, Vienna, VA (US); Robert Lloyd Coxe, Jr., Vienna, VA (US); John Joseph Dials, Jr., Vienna, VA (US); Christine W. McKay-Donovan, Vienna, VA (US)

(73) Assignee: ID DATAWEB, INC., Vienna, VA (US)

( * ) Notice: Subject to any disclaimer, the term of this patent is extended or adjusted under 35 U.S.C. 154(b) by 50 days.

(21) Appl. No.: 15/156,599

(22) Filed: May 17, 2016

(65) Prior Publication Data

US 2016/0308852 A1 Oct. 20, 2016

Related U.S. Application Data

(62) Division of application No. 14/410,305, filed as application No. PCT/US2013/048952 on Jul. 1, 2013, now Pat. No. 9,372,972.

(Continued)

(51) Int. Cl.
*H04L 9/32* (2006.01)
*H04L 29/06* (2006.01)
(Continued)

(52) U.S. Cl.
CPC .......... *H04L 63/0815* (2013.01); *G06F 21/31* (2013.01); *G06F 21/41* (2013.01);
(Continued)

(58) Field of Classification Search
CPC .......... G06F 21/30; G06F 21/31; G06F 21/60; G06F 21/604; G06F 21/62;
(Continued)

(56) References Cited

U.S. PATENT DOCUMENTS 5,987,440 A 11/1999 O'Neil et al.
2002/0023059 A1 2/2002 Bari et al.
(Continued)

FOREIGN PATENT DOCUMENTS

EP 1985085 B1 6/2009

OTHER PUBLICATIONS

Extended European Search Report, EP Application No. 13809365.3, Reference 81.51.122311, dated May 6, 2016.
(Continued)

*Primary Examiner* — Eric W Shepperd
(74) *Attorney, Agent, or Firm* — The Marbury Law Group, PLLC

(57) ABSTRACT

A system and method for establishing and monetizing trusted identities in cyberspace relying upon user opt in. Users request to attain secure IDs for accessing parties that will rely on secure IDs to complete a transaction, for example merchants and service providers (relying parties). The relying parties (RPs) communicate with identity service providers and attribute providers via an Attribute Exchange Network (AXN) in order to obtain verified attributes associated with an entity (end user or user) that wishes to conduct business with the relying party. The relying party makes requests for verified attributes that are important to consummating business transactions for the relying party. Users are informed of requests for attributes on behalf of relying parties and users have the option to verify attributes, and add new attributes that may be useful or required for conducting business with relying parties.

15 Claims, 16 Drawing Sheets

Related U.S. Application Data

(60) Provisional application No. 61/764,619, filed on Feb. 14, 2013, provisional application No. 61/762,527, filed on Feb. 8, 2013, provisional application No. 61/753,247, filed on Jan. 16, 2013, provisional application No. 61/676,140, filed on Jul. 26, 2012, provisional application No. 61/666,560, filed on Jun. 29, 2012.

(51) Int. Cl.
| | | |
|---|---|---|
| *G06F 21/31* | (2013.01) | |
| *G06F 21/41* | (2013.01) | |
| *G06F 21/60* | (2013.01) | |
| *G06Q 20/00* | (2012.01) | |
| *G06F 21/62* | (2013.01) | |

(52) U.S. Cl.
CPC ........ *G06F 21/604* (2013.01); *G06F 21/6245* (2013.01); *G06Q 20/00* (2013.01); *H04L 9/321* (2013.01); *H04L 9/3213* (2013.01); *H04L 63/06* (2013.01); *H04L 63/0807* (2013.01); *H04L 63/0884* (2013.01); *H04L 63/102* (2013.01)

(58) Field of Classification Search
CPC ............ G06F 21/6209; G06F 21/6245; G06F 21/6272; G06F 2221/2141; H04L 9/32; H04L 9/321; H04L 9/3213; H04L 9/3226; H04L 2209/76; H04L 63/08; H04L 63/083; H04L 63/10; H04L 63/101; H04L 63/102
See application file for complete search history.

(56) References Cited

U.S. PATENT DOCUMENTS

| | | | |
|---|---|---|---|
| 2006/0034494 A1 | 2/2006 | Holloran | |
| 2006/0155993 A1* | 7/2006 | Busboon | G06F 21/31 713/169 |
| 2006/0229911 A1 | 10/2006 | Gropper et al. | |
| 2006/0253526 A1 | 11/2006 | Welch et al. | |
| 2009/0077637 A1 | 3/2009 | Santos et al. | |
| 2009/0100529 A1 | 3/2009 | Livnat et al. | |
| 2009/0132813 A1 | 5/2009 | Schibuk | |
| 2009/0259611 A1 | 10/2009 | Wang et al. | |
| 2009/0300355 A1 | 12/2009 | Crane et al. | |
| 2009/0300512 A1 | 12/2009 | Ahn | |
| 2009/0300742 A1 | 12/2009 | Ahn | |
| 2010/0071056 A1* | 3/2010 | Cheng | H04L 63/0815 726/16 |
| 2010/0083358 A1 | 4/2010 | Govindarajan et al. | |
| 2010/0116880 A1 | 5/2010 | Stollman | |
| 2010/0185871 A1 | 7/2010 | Scherrer et al. | |
| 2010/0251353 A1 | 9/2010 | Hodgkinson | |
| 2011/0113488 A1 | 5/2011 | Schultz et al. | |
| 2011/0179475 A1 | 7/2011 | Foell et al. | |
| 2011/0224509 A1 | 9/2011 | Fish et al. | |
| 2011/0296171 A1 | 12/2011 | Fu et al. | |
| 2012/0079568 A1 | 3/2012 | Whitmyer | |
| 2012/0144034 A1 | 6/2012 | McCarty | |
| 2012/0173881 A1 | 7/2012 | Trotter et al. | |
| 2013/0064247 A1* | 3/2013 | Song | H04L 12/4641 370/392 |
| 2013/0091172 A1 | 4/2013 | Kelesis | |
| 2013/0263233 A1 | 10/2013 | Dinha | |

OTHER PUBLICATIONS

Communication pursuant to Rules 70(2) and 70a(2) EPC, EP Application No. 13809365.3, Reference 81.51.122311, dated May 24, 2016.

Yoshisato Takeda, "Avoidance of Performance Bottlenecks Cause by HTTP Redirect in Identity Management Protocols", ACM, 2 Penn Plaza Suite 701, New York, pp. 25-32, XP040050485, dated Nov. 3, 2006.

Schroder, Martin, "SAML Identity Dederation und die eID-Funktionalitat des nPA", internet source https://sar.informatik.hu-berlin.de/research/publications/SAR-PR-2011-08/saml_.pdf, p. 33, line 21—p. 40, line 2, retrieved Jan. 8, 2016.

International Search Report in International Application No. PCT/US2013/048952, dated Oct. 22, 2013.

Takeda, et al., "Avoidance of Performance Bottlenecks Caused by HTTP Redirect in Identity Management Protocols", ACM, XP040050485, pp. 25-32, Nov. 3, 2006.

Schroder, "SAML Identity Federation and die eID-Funktionalitat des nPA", XP055242522, https://sar.informatik.hu-burlin.de/research/publications/SAR-PR-2011-08/saml, 49 pages, Jun. 13, 2011.

European Search Report from the European Patent Office in Application No. EP 13809365.3-1870/2867814, PCT/US2013/048952 dated Jan. 8, 2015.

International Preliminary Report on Patentability (Chaper 1 of the Patent Cooperation Treaty) and Written Opinion of the International Searching Authority in International Application No. PCT/US2013/048952 dated Jan. 25, 2016.

* cited by examiner

SYSTEM AND METHOD FOR ESTABLISHING AND MONETIZING TRUSTED IDENTITIES IN CYBERSPACE WITH PERSONAL DATA SERVICE AND USER CONSOLE

This application is a divisional application of application Ser. No. 14/410,305 filed on Dec. 22, 2014 which is a national stage entry of international application No. PCT/US2013/048952, filed Jul. 1, 2013, entitled "System and Method for Establishing and Monetizing Trusted Identities in Cyberspace with Personal Data Service and User Console" (International Publication No. WO 2014/005148), which claims benefit of priority to U.S. Provisional Application No. 61/666,560 filed Jun. 29, 2012, entitled "System and Method for Establishing and Monetizing Trusted Identities in Cyberspace", U.S. Provisional Application No. 61/676,140 filed Jul. 26, 2012, entitled "System and Method for Establishing and Monetizing Trusted Identities in Cyberspace", U.S. Provisional Application No. 61/753,247 filed on Jan. 16, 2013, entitled "System and Method for Establishing and Monetizing Trusted Identities in Cyberspace with Personal Data Service and User Console", U.S. Provisional Application No. 61/762,527 filed on Feb. 8, 2013, entitled "System and Method for Establishing and Monetizing Trusted Identities in Cyberspace with Personal Data Service and User Console", and U.S. Provisional Application No. 61/764,619 filed on Feb. 14, 2013 entitled "System and Method for Establishing and Monetizing Trusted Identities in Cyberspace with Personal Data Service and User Console". The contents of which are incorporated by reference for all purposes.

A portion of the disclosure of this patent document contains material which is subject to copyright protection. In particular, the drawings illustrated in FIGS. 1-11 are protected works. The copyright or mask work owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

Transacting business in cyberspace often comprises organizations collecting information about individuals to gain assurance that the individual is actually who they are claiming to be. This can take the form of credit checks, or verification of some subset of data, that can be accomplished using data from typical credit score organizations such as Experian, LexisNexis, and Trans Union, although others exist as well. Other methods of verifying an individual's identity are also used, such as mailing a log-in password or PIN to an address supplied by the individual.

On-line businesses, agencies, etcetera have a growing need to gain satisfactory levels of identity assurance efficiently and in real time while reducing account creation and maintenance costs. Single sign-on capability, whereby a sign-on credential established by one entity is relied upon by other entities, has grown in popularity in response to these cost concerns, but single sign-on alone will often not afford enough identity assurance.

As on-line transactions continue to grow in popularity, individuals are finding that they have multiple passwords for various accounts, and it becomes challenging to not only keep track of the various passwords, but also to manage and recall the personal data that has been shared with various on-line businesses.

The threat of hackers looking to steal personal data also creates an ever-growing need for secure data storage and evolving data security schema.

SUMMARY

Embodiments are directed to establishing and monetizing trusted identities in cyberspace relying upon user opt in. Users assert secure credentials and attributes to complete an online log-in, application or transaction, for example with merchants and service providers (relying parties). The relying parties (RPs) communicate with identity providers (IdPs) and attribute providers (APs) via an Attribute Exchange Network (AXN) in order to obtain credential authentication and attribute verifications (claims) associated with an entity/user that wishes to conduct business with the RP. The RP requests verified attributes that are important to consummating business transactions for that RP. Once attributes are verified, the RP is informed that the user's attributes have been verified and may be used to facilitate business transactions. RPs make payment to APs and IdPs via the AXN provider, or the AXN provider makes payment on behalf of the RPs and the RPs pay the AXN provider, or the AXN provider pays APs and IdPs as appropriate and charges the RPs for its own value-added services. Payments could be made for attribute verification attempts and credential authentications on a transactional or periodic basis depending upon the nature of the transactions involved.

In an embodiment, an attribute that is asserted on line may be verified using an AXN device. The AXN device receives a verification request from a computing device operated by a RP, identifies at least one AP associated with the RP for purposes of attribute verification, sends a verification request to a computing device operated by the at least one AP, and sends a claim received by the at least one AP from a computing device operated by an end user of the at least one AP to the computing device operated by the RP via the AXN device.

In another embodiment, the AXN device associates a claim with a sign-on credential, such as an OpenID credential, being asserted by the end user.

In an embodiment, the verification request sent to the computing device operated by the AP does not contain information identifying the RP.

In an embodiment, the information identifying the RP is passed from the AXN device to the computing device operated by the AP.

In an embodiment, access to end user-asserted attributes is provided using an AXN device. The AXN device receives at least one end user-asserted attribute, associates at least one end user-asserted attribute with an end user credential, stores a record of the credential and at least one associated attribute by attribute type, creates an encrypted token containing the user asserted attributes, sends the encrypted token to a user-selected network location, which allows the user-selected location to be associated with a key to be retained by the AXN, and accesses the encrypted token using the key in response to a request that includes the associated end user credential from a computing device operated by the user.

In an embodiment, the encrypted token may include personal identifying information of the end user, enterprise data and/or preference data.

In an embodiment, the AXN device accesses the encrypted token using the key in response to a request from a computing device operated by the user by receiving a subsequent assertion of the credential from a computing device operated by a RP, retrieving the encrypted token using the key, generating a web page comprising at least a portion of the at least one associated attribute, and providing access to the web page by the computing device operated by the end user.

In an embodiment, access to end user-asserted attributes is provided using an AXN device. The AXN device receives a first credential asserted by an end-user to one or more RPs, accesses a database, requests a first location of a first encrypted token associated with the asserted first credential from the database, acquires the first encrypted token associated with the asserted first credential from the first location, acquires from the first encrypted token a first set of attributes of the end user, wherein the first set of attributes further identifies permissions granted by the end user to the one or more RPs to view attributes selected from the first set of attributes, populates a web page with the first set of attributes and the permissions for each of the one or more RPs to view attributes selected from the first set of attributes.

In an embodiment, the AXN device links a second credential to the first credential.

In an embodiment, the AXN device acquires the second credential using the first credential, requests a second location of a second encrypted token associated with the second credential, acquires the second encrypted token associated with the second credential from the second location, acquires from the second encrypted token from a second set of attributes of the end user that further identifies permissions granted by the end user to the one or more RPs to view attributes selected from the second set of attributes, and populates the web page with the second set of attributes and the permissions for each of the one or more RPs to view attributes selected from the second set of attributes.

In an embodiment, access to attribute verification data is managed using an AXN device. The AXN device receives a request from a computing device operated by an end user to open a browser session, which requests comprises a unique identifier associated with the end user via a first credential and provisions the user computing device to access a web page in response to the request.

In an embodiment, the unique identifier is supplied to a computing device of a registered RP by the AXN device during a verification flow associated with the end user.

In an embodiment, the unique identifier is a meaningless but unique number (MBUN).

In an embodiment, the web page links a permission granted by the end user to a RP and the AXN device provisions the computing device operated by the user to revoke the permission granted to the RP.

In an embodiment, the AXN device provisions the computing device operated by the user to remove the RP.

In an embodiment, the AXN device provisions the computing device operated by the user to the first credential with at least a second credential.

DETAILED DESCRIPTION

Figure 1:
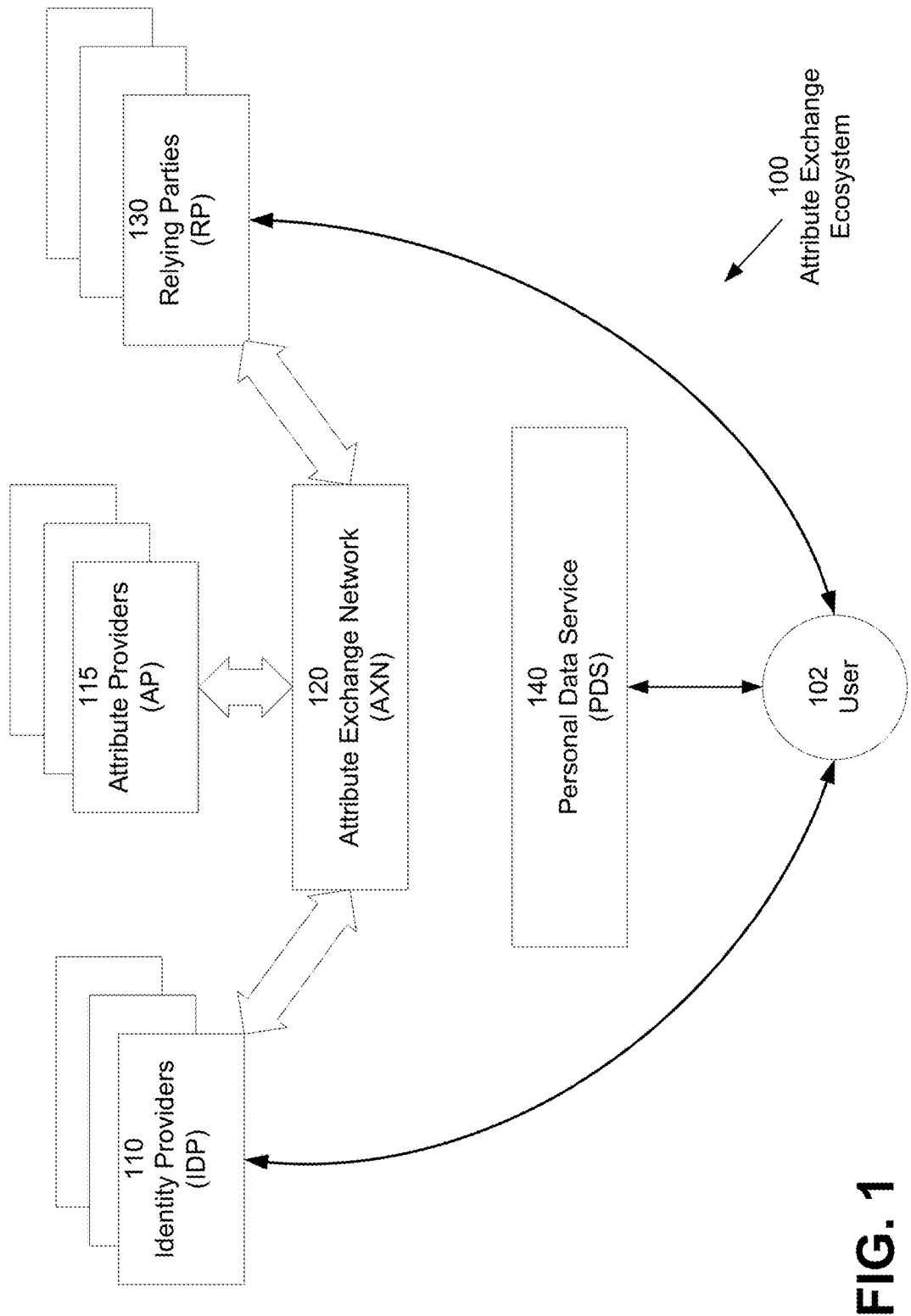
FIG. 1 is a block diagram illustrating an attribute exchange ecosystem according to an embodiment.

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

For purposes of this application, the following terms have the meaning ascribed to them:

Credential—An established log-in mechanism such as an email address, user ID, or a Common Access Card (CAC). An end user is issued a digital credential by an identity provider (IdP or IDP), such as their bank, employer, a government agency, email provider or social network provider, with which they already have an online relationship. Relationships are then established with the IDP to use the credential to interact online with various other service providers called Relying Parties (RPs). Credentials used in this fashion may be referred to as federated credentials or single sign on credentials, a common form of which is an OpenID. This digital credential is used in lieu of creating a new user name and password to interact online with each RP service provider.

Attribute Exchange Network (AXN): The AXN is a system or protocol entity that may act as a transaction and claims manager and facilitator, interacting with the appropriate entities to ensure that user-asserted attributes are securely verified by participating APs, and attribute claims from the AP are delivered with the user asserted attributes to the requesting RP. The AXN may also collect revenues and distribute payments on behalf of network participants in accordance with the AXN business model, and may provide a user admin console whereby users can manage the distribution of verified attributes. In certain embodiments, the AXN does not store user attribute information but uses an OpenID credential, or a secure identifier associated with a credential such as an MBUN, as an account reference key. The AXN may sometimes be referred to as an Attribute Provider Network (APN);

User Admin Console: a console dynamically updated, generated and made available to users only when a user's credential is authenticated enabling access to an AXN-registered RP site. The console may be accessed via a link on a page at the RP site, allowing users to view and manage their attribute sharing history on a per-attribute and/or a per-RP basis. The following terms may be used interchangeably to reference the User Admin Console: User Attribute Management Console, MAX, MAX Console, UMA Console, User Console, UMC and User Managed Admin Console;

User Agent: The user is expected to operate an agent that is capable of receiving and processing HTTPS protocol requests, such as redirections that convey header information to and from other parties. The most common user agent is a browser;

Relying Party (RP): The RP is the protocol entity wishing to consume verified attributes. RPs may be merchants or service providers with an online presence. Usually the consumption of verified attributes is initiated by some user action such as a request for access to RP services;

Identity Provider (IDP or IdP): The IDP is the protocol entity that collects and authenticates a persistent identifier, i.e. a credential, such as an OpenID credential, on behalf of the user. The IDP is responsible for protecting the integrity of this identifier and all tokens, scopes, attributes and consent exist relative to that identifier. Various credential schemes are well known in the art, such as OpenID Connect, SAML (Security Assertions Markup Language), or IDP;

Attribute Provider (AP): An AP is the protocol entity verifying information about a user. The AP does not have any direct relationship to the end user;

Personal Data Service (PDS) (sometimes also referred to as a Personal Data Store): In certain embodiments, an individual user's Personal Identifiable Information (PII) is not stored at the AXN, but encrypted and stored as a "PDS" at a network location of the user's choosing accessible by the user only upon successful credential assertion at a registered RP site, as such the access to this PDS is user controlled. A user could have multiple PDSs that may be associated with one or multiple credentials of that user.

MBUN: a unique identifier used to recognize a unique credential in a standard way externally to the AXN. It is assigned at the time the credential is first used and then all future use of the credential may be referenced using the MBUN. The MBUN may be used as the reference key to the PDS. The MBUN is also shared with the RP as a means for them to come back and request transaction and billing details associated with the user from the AXN. At the AXN a record of credentials and associated MBUNs is securely maintained. Separately, a record of claims is maintained and associated with the appropriate MBUN. This affords greater data minimization than using the actual credential or even a PID (unique identifier issued by an IdP for any given credential), and this allows for dynamic generation of a user admin console, using the MBUN to identify an associated PDS and combine with the associated claims stored at the AXN, and to display per RP. The MBUN may be generated by hashing the credential with an IdP company ID, thus ensuring its randomness and uniqueness. In another embodiment, rather than hashing the credential and IdP company ID, the MBUN is generated by using a universally unique random identifier algorithm which is a 36 character string. Longer strings may be used for additional security.

PID: a unique identifier issued by an IdP for any given credential. The MBUN is similar to a PID in that it is also a unique Identifier for a given credential. The variance comes in credential federation. In one embodiment the AXN uses the same MBUN regardless of the number of RPs the user accesses with that credential. If required, for example by a trust framework, to comply to the PID standard that IdP's are held to with regards to sharing of credentials, in particular the requirement that there be a unique PID per RP, then the AXN will hash the MBUN with the RP API key (OpenID acceptor Application Programming Interface key) to create a PID for members of that community.

OpenID an open standard that describes how users can be authenticated in a decentralized manner, eliminating the need for services to provide their own ad hoc systems and allowing users to consolidate their digital identities. Users may create accounts with their preferred OpenID IdPs, and then use those accounts as the basis for signing on to any website which accepts OpenID authentication. The OpenID standard provides a framework for the communication that must take place between the IdP and the OpenID acceptor (the RP). An extension to the standard (the OpenID Attribute Exchange) facilitates the transfer of user attributes, such as name and gender; from the OpenID IdP to the RP (each RP may request a different set of attributes, depending on its requirements).

Open Standard For Authorization (OAuth)—OAuth allows users to share their private resources (e.g. photos, videos, contact lists) stored on one site with another site without having to hand out their credentials, typically supplying username and password tokens instead. Each OAuth token grants access to a specific site (e.g., a video editing site) for specific resources (e.g., just videos from a specific album) and a defined duration (e.g., the next 2 hours). This allows a user to grant a third party site access to their information stored with another service provider, without sharing their access permissions or the full extent of their data.

SAML (Security Assertions Markup Language) 2.0—The current version of an Oasis standard XML-based protocol/identity scheme that uses tokens containing assertions to pass information, usually between an end user, an IdP, and an RP service.

The AXN is based on a distributed architecture that can be used to share credential and attribute information about a user between multiple parties. Users will use an OpenID to log into an RP and/or to create a new account. In an embodiment, RPs who are registered with the AXN will request a user to assert attributes, such as their name, address and phone number. The request may come as a form that is provisioned in a secure browser session with the AXN, as a redirect from the RP site. The user-provided attributes are then passed via the AXN to an AP (or APs) pre-selected by the RP for verification. The AP returns a claim to the AXN that either the assertions have matches in the AP's database, or they don't, and the AXN passes the claim to the RP. The AXN is both a service hub and a contractual hub.

FIG. 1 is a block diagram illustrating an attribute exchange ecosystem 101 according to an embodiment. In an embodiment, an AXN 120 facilitates identity verification for users 102, APs 115, RPs 130, and IdPs 110. In an embodiment, the AXN 120 is responsible for the processes associated with establishing, maintaining, and distributing verified user identity attributes. An attribute provider 115 on the AXN 120 verifies a user-asserted attribute, i.e. makes a claim, and the AXN 120 provisions that claim, with permission of user 102, in response to attribute requests from RPs 130. The user's PII may be stored in a PDS 140 at an online service or it may be on a device controlled by the user 102. In an embodiment, the user may access the user's PII stored in the PDS 140 via the AXN 120 by successfully asserting a credential at a RP 130 that is registered with the AXN 120.

A user 102 is issued an OpenID credential by an IDP, such as a government agency, bank, e-mail or social network provider with whom they have an established online relationship.

Upon successful assertion of the OpenID credential at the RP site, the RP 130 will pay to verify additional user identity attributes such as full name, street address, phone number, or age to satisfy the RPs security requirements and reduce risk. The user is not charged to participate. The AXN enables this identity ecosystem by providing a common API gateway that allows RPs, IDPs, and APs to interact using a one-to-many relationship model that reduces barriers to entry in the identity ecosystem.

Figure 2:
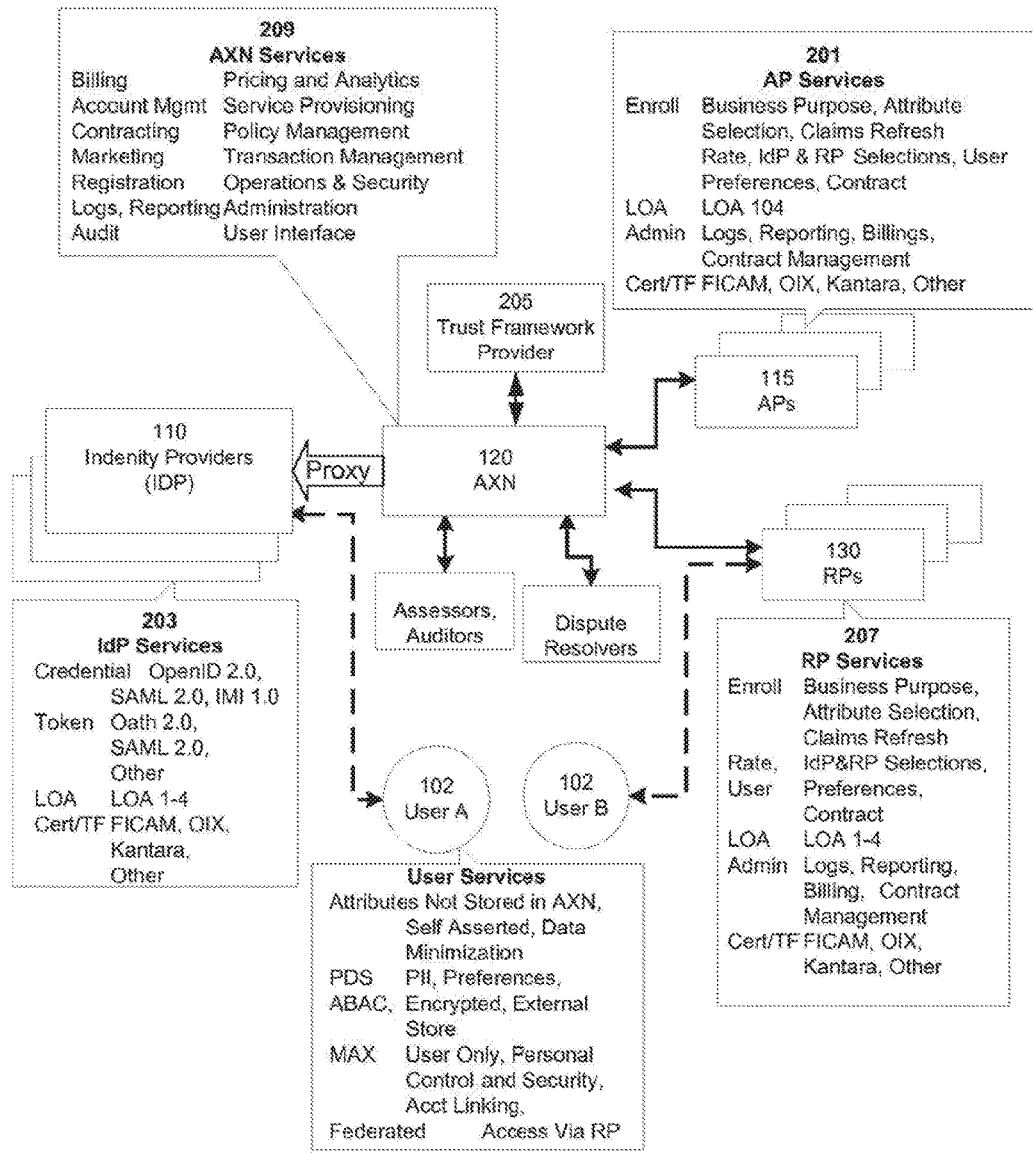
FIG. 2 is a block diagram illustrating an AXN framework according to an embodiment.

FIG. 2 is a block diagram illustrating an AXN framework according to an embodiment.

The AXN services framework shown in FIG. 2 enables a competitive online attribute exchange marketplace whereby IdPs 110 post their credential authentication services, APs 115 post available attribute verification service packs, and registered RPs 130 select registered AP and IdP services as follows:

AP Management Console 201 is used by an AP 115 to establish an account, and to register and post their portfolio of attribute verification services, manage monetization options (e.g., per transaction fees, per user per year fees, and periodic (quarterly, annual) subscription fees), review transaction logs, and ultimately manage exchange contracts (e.g., spot versus term pricing formats for packaged attribute verification services). As more APs engage on the AXN 120, multiple AP services may be engaged by the RPs 130 when verifying user attribute assertions. For example, if a user cannot be verified with Experian, the RP 130 may configure the AXN 120 to attempt to verify with LexisNexis or other APs before mailing a PIN code to the user's street address.

IdP Management Console 203 is used by an IdP 110 to establish an account, manage monetization options (e.g., per transaction fees, periodic (quarterly, annual) subscription fees), review transaction logs, and ultimately manage exchange contracts. IdPs 110 who register credential authentication services must specify support for credential types, token types, and corresponding LOAs (levels of assurance). IdPs will also specify which of their services have been approved or certified by Trust Frameworks 205 such as FICAM (Federal Identity, Credential, and Access Management), Open Identity Exchange (OIX), Kantara, and others. These trust framework certifications may be used by RPs 130 to control which IdPs 110 will be engaged by their RP service.

RP Management Console 207 allows RPs 130 to enroll and choose from a list of IdP and AP service options. RP enrollment may include providing a corporate contact, billing, and background information, and stating the business purpose for each requested service. Registration of the RP on the AXN 120 results in the hand-off of a client ID and shared secret for future interaction. In certain embodiments the shared secret is referred to as an sitoken.

The AXN 120 may serve as a reseller to IdPs 110 and APs 115, and review and approve each RP service application prior to ratifying a contract and provisioning AXN services. A given RP 130 will select from a combination of service packages (e.g., Real-time AP services, plus Phone SMS, plus Phone call, plus device ID, etc.), a specific configuration of IdP services (e.g., SAML credentials, OAuth tokens and/or SAML, LOA 3 non-PKI, FICAM approved vendors only), and a menu of user attributes (e.g., Name, Email, Address, Telephone, SS#, Gender, Age, CAC cert, etc.) to be verified per service.

AXN Management Console 209 is provided for the AXN administrators. Screens within this console allow access to lists of participating IdPs, APs, and RPs; operating statistics, billing, reports, transaction logs; and account management services.

Figure 3:
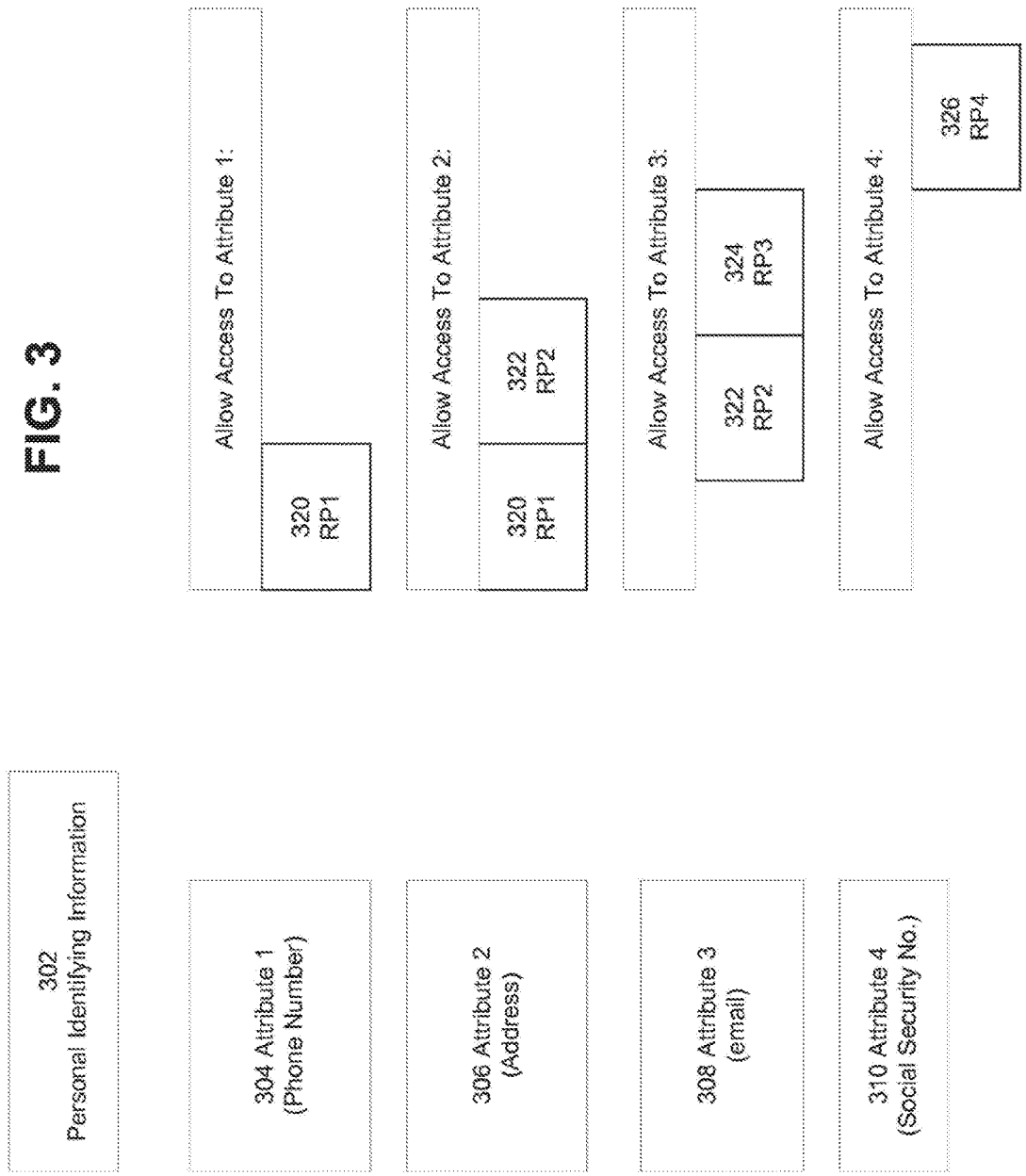
FIG. 3 is a screen shot illustrating graphical user interface generated by the AXN according to an embodiment.

FIG. 3 is a block diagram illustrating graphical user interface generated by the AXN according to an embodiment.

The graphical user interface illustrated in FIG. 3 may be referred to as a User Managed Administration (UMA) Console, a MAX (My Attribute Exchange), or a User Admin Console. The interface, is created the first time a user grants permission to share their verified attributes via the AXN with an online RP that is registered with the AXN. As illustrated in FIG. 3, the user admin console allows a user to revoke or suspend an RPs access to an identity attribute verification.

Once the RP 130 and the IdPs 110 have established their relationship with the AXN 120, users 102 can login using their credentials, assert attributes, for example, attributes 1-4 (Blocks 304, 306, 308 and 310 respectively). The attributes may include, for example, name, email, physical address, and telephone (NEAT), social security number and consent to allowing one or more of the RPs 130, for example RPs 1-4 (Blocks 320, 322, 324 and 326) respectively to verify the attributes via the AXN 120 using third party AP services. The AXN 120 enables the user 102 to securely assert the required attributes and give permission for verification using a webpage interface that is delivered to the RP 130 from the AXN (a verification form). The specification for attributes requested in the webpage is established in the initial RP/AXN service contract. The AXN 120 stores verified claims of user-asserted attributes, for example the information provided from an AP 115 that confirms a record of the user-provided name matching the user-provided address, but the AXN 120 does not store the user-asserted attributes (actual name and address) that were entered in the webpage. The verified, user-asserted attributes are transferred from the user's browser to a PDS and are simultaneously securely distributed to the appropriate RP. The PDS and the PII 302 are not stored at the AXN 120. They are stored at the IdP 110 in a PDS, an anonymous data store, or at another location of the users choosing, such as a user-designated secure online data store or in a user designated device. The PDS is available for any future user logins via the AXN 120 at the RP 130.

Figure 4A:
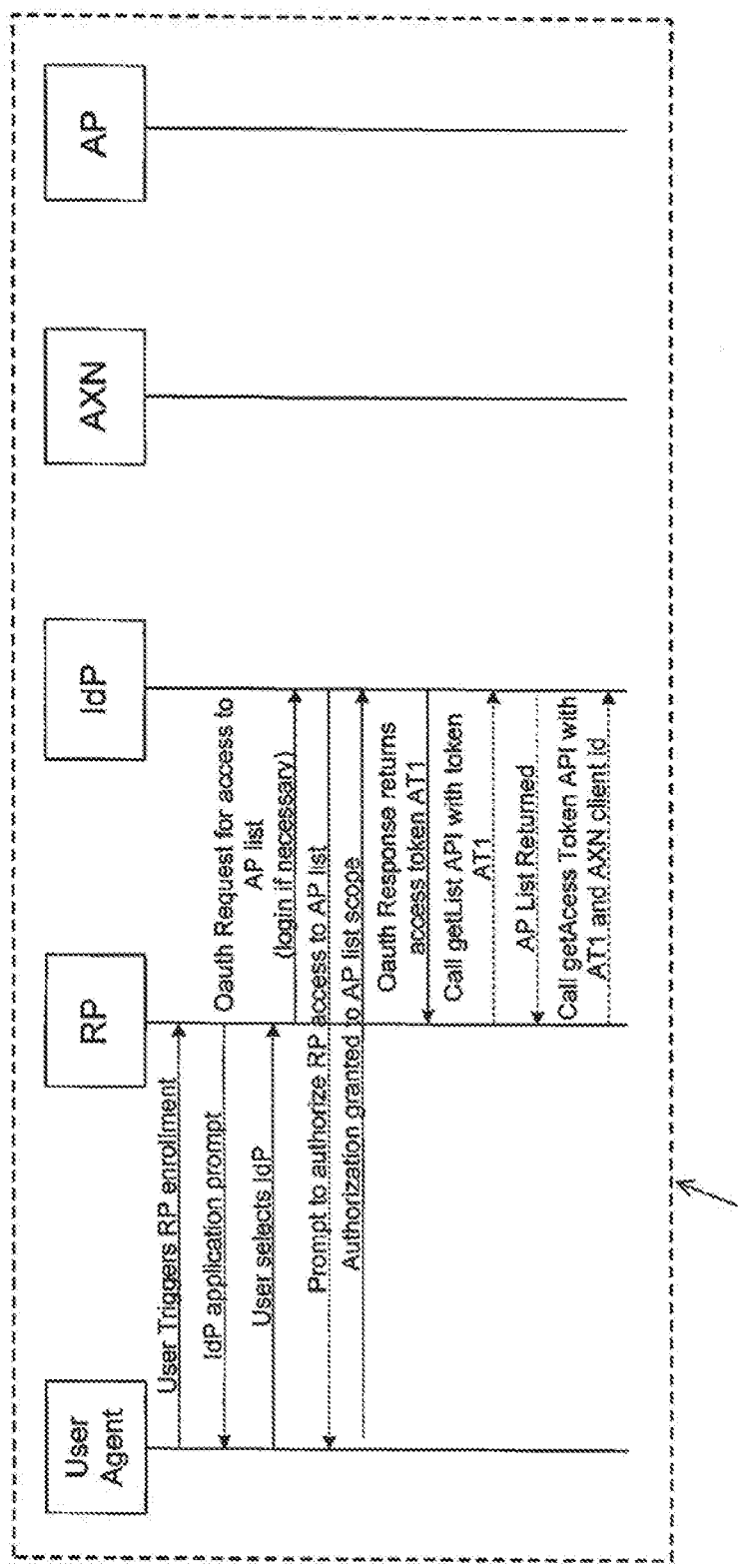
FIGS. 4 A, B and C are flow diagrams illustrating an attribute sharing process according to another embodiment.
Figure 4B:
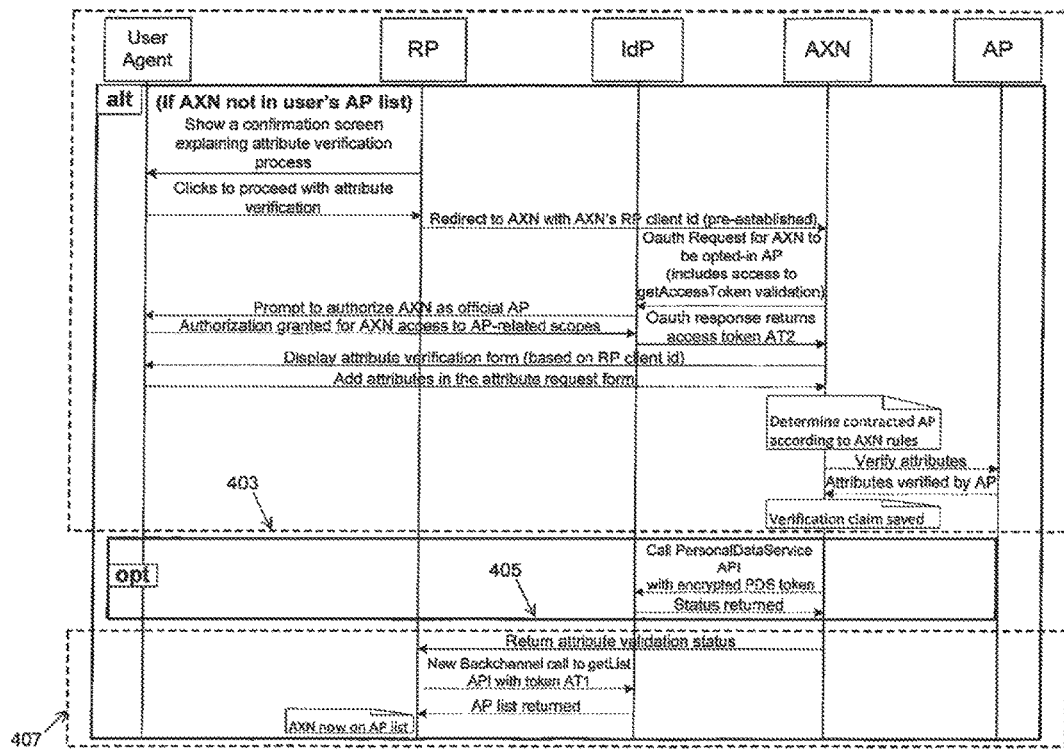
Figure 4C:
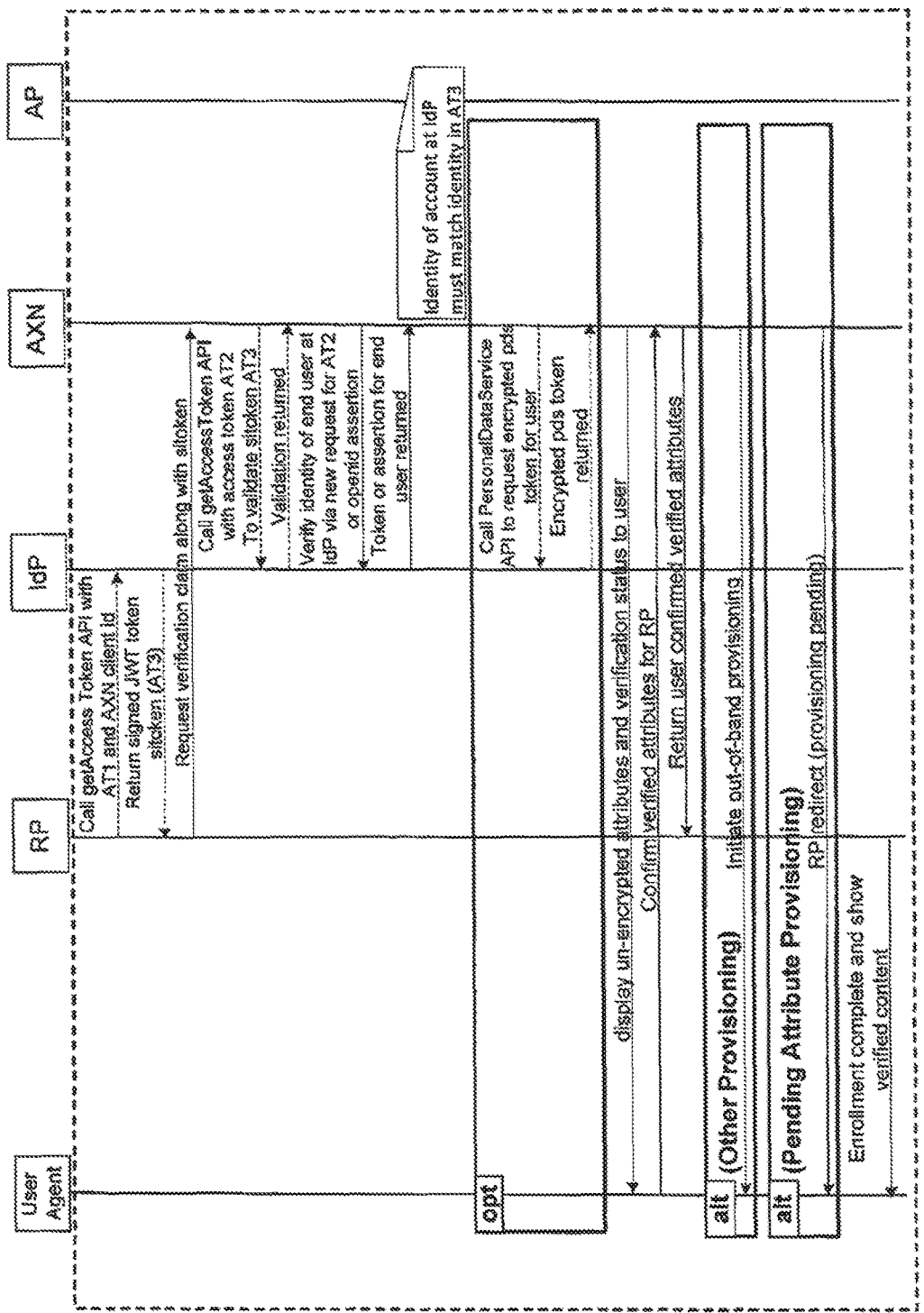

FIGS. 4 A, B and C are flow diagrams illustrating an attribute sharing process according to another embodiment. These diagrams illustrate communication flows when a user enrolls with an RP via an AXN for the first time. In this embodiment, the AXN is not acting as a proxy for the RP for the credential authentication steps, and the RP has a direct relationship with the IdP for that authentication.

Section 401 shows steps taken between an end user, an RP and an IdP when an end user (user agent) attempts to log in to an RP using a credential issued by an IdP. The AXN provider has provisioned software to the RP enabling this process. In this embodiment a relationship has been established between the RP and the IdP, and the AXN is not acting as a proxy for the RP.

Section 403 shows steps taken to obtain end user's self-asserted attributes and consent to the verification process, and the steps taken by the AXN to pass the asserted attributes to an AP and receive a verification claim (a claim) from an AP at the AXN. A PDS is created at section 405.

Section 407 shows steps taken to notify RP of a claim and deliver the claim and attributes to the RP.

Section 409 shows remaining steps taken in an attribute sharing process.

Figure 5:
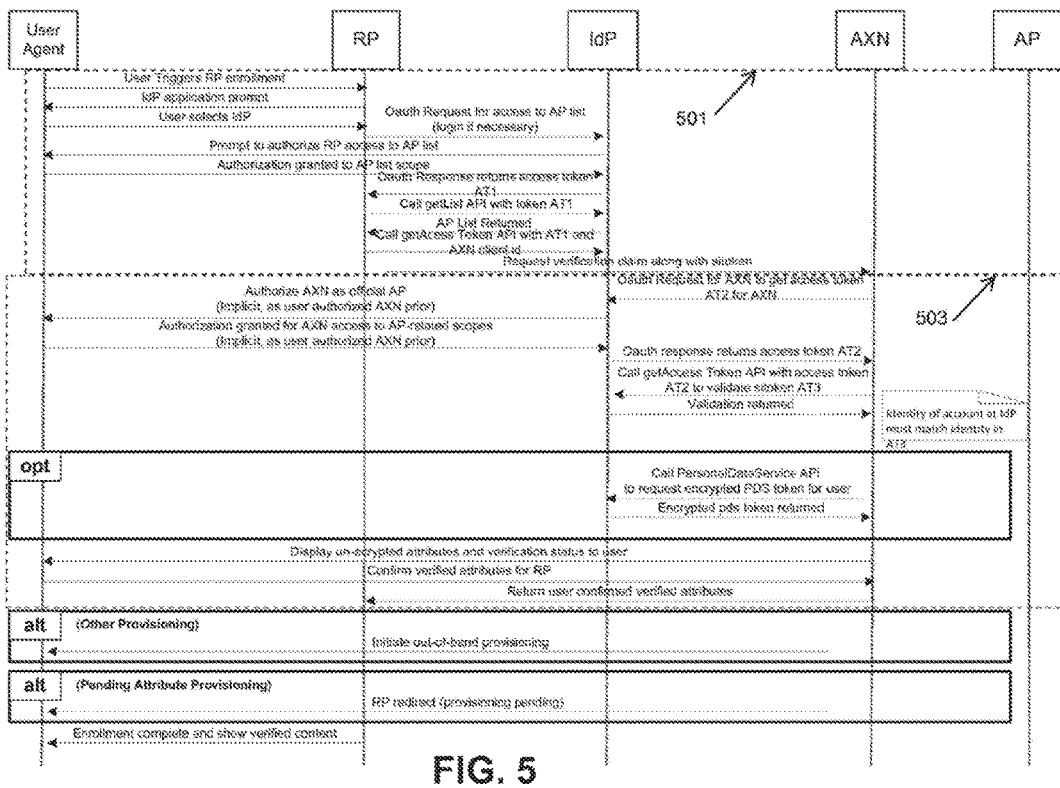
FIG. 5 is a flow diagram illustrating an attribute sharing process according to another embodiment.

FIG. 5 is a flow diagram illustrating an attribute sharing process according to an other embodiment.

In this embodiment, as in FIGS. 4, the AXN is not acting as a proxy for the IdP, and now the AXN, for a new RP where the user wishes to enroll, is acting as an AP by relying on a claim stored at the AXN associated with a previous assertion done for a previous RP. Section 501 shows steps taken between an end user, an RP and an IdP to log in to an RP using a credential issued by the IdP, and to get permissions and appropriate access to receive claims from the AXN. In this embodiment there is no request for an AP to verify the user asserted attributes because the AXN is relying on a previous assertion and claim, and is therefore acting as the AP in this example. Section 503 shows the steps taken that enable the AXN to act in this capacity and return claims and attributes to the RP. Since the user is relying on previously asserted and verified attributes, the AXN retrieves them from the PDS and displays them to the end user for confirmation, and then passes them to the new RP. The user doesn't need to reassert attributes if they are still valid.

Figure 6:
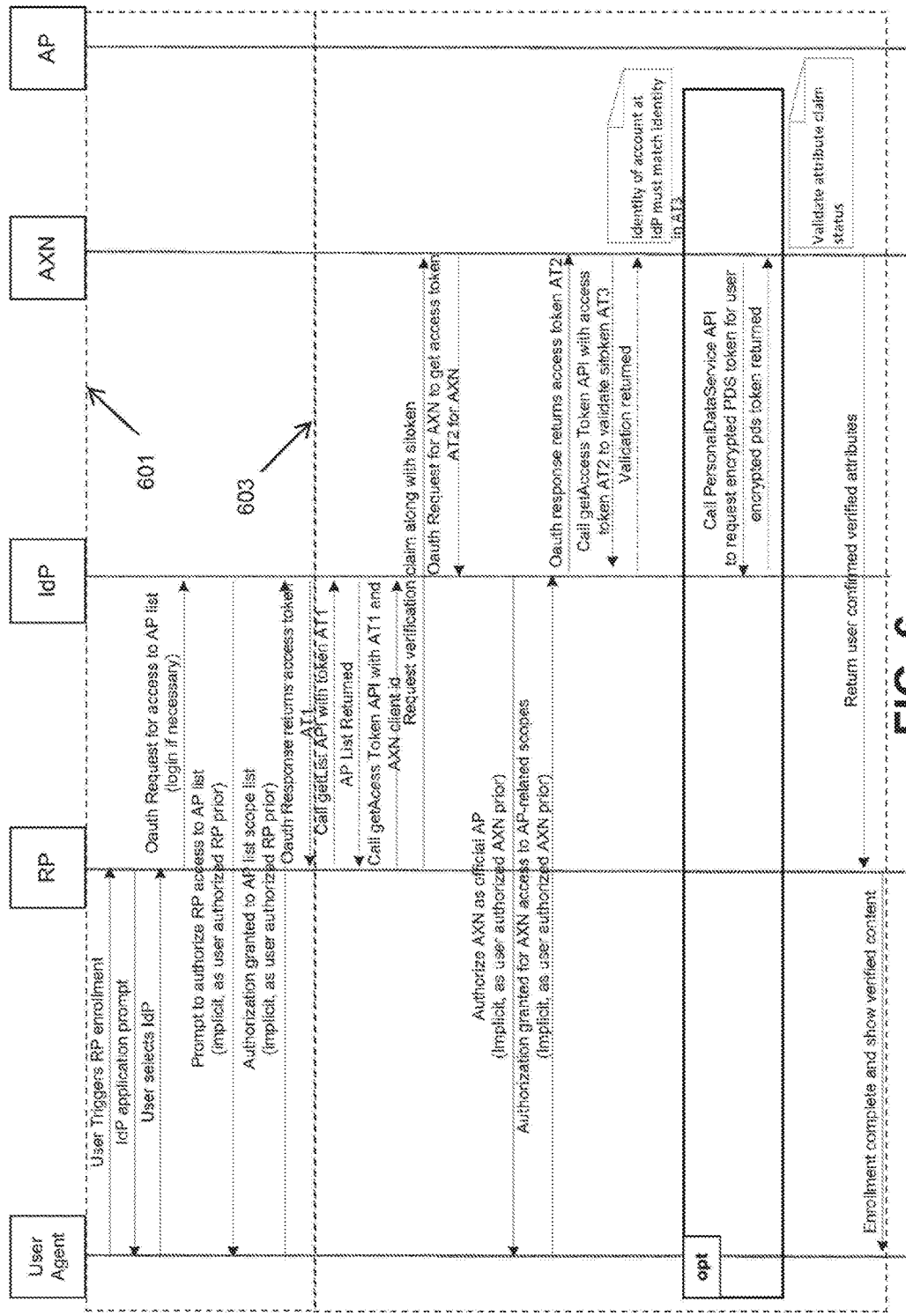
FIG. 6 is a flow diagram illustrating an attribute sharing process according to another embodiment.

FIG. 6 is a flow diagram illustrating an attribute sharing process according to an other embodiment.

At section 601, a user returning to an RP where they have already previously enrolled via the AXN, asserts a previously used credential to log in. Section 603 then shows the steps taken by the AXN to confirm that claims associated with the credential and this RP already exist, including accessing the PDS, shown here as being stored at the IdP, and to return attributes to the RP. The end user does not have to reenter attributes if this return to the RP has occurred within the time period before the RP requires a fresh verification claim from an AP.

Figure 7A:
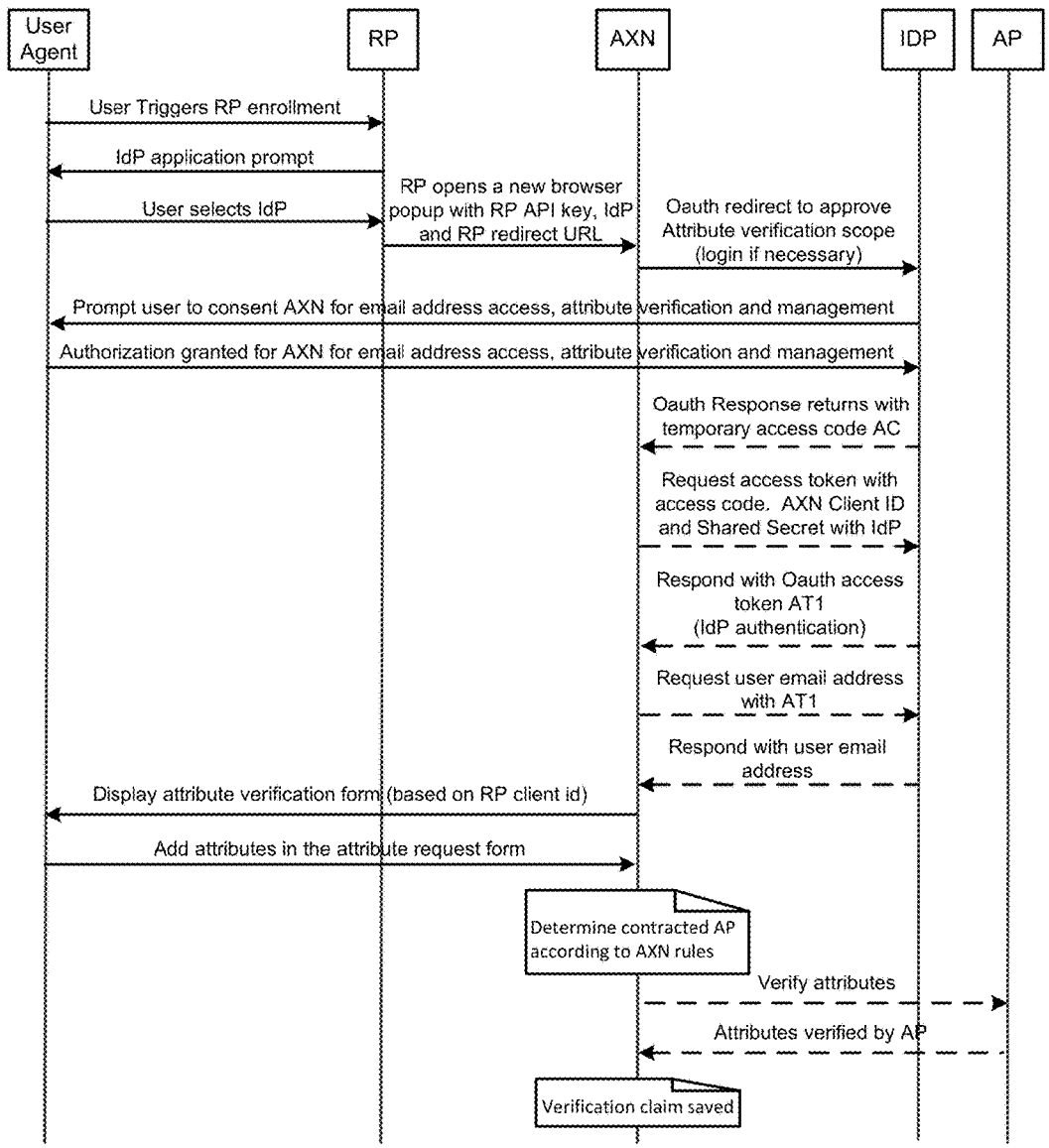
FIGS. 7A and 7B are flow diagrams illustrating an attribute sharing process according to another embodiment.

FIG. 7A is a flow diagram illustrating another embodiment where, as in FIGS. 4 A, B and C, a user is newly enrolling with an RP via the AXN.

In this embodiment the AXN is acting as a proxy for the RP and is querying and receiving authentication from the IDP regarding the users credential assertion. This affords an additional degree of data minimization by masking the identity of the RP from the IDP. Since the user is a first time RP enroller via the AXN, the AXN queries an AP designated by the RP for attribute verification, and the AP sends back claims to the AXN.

Figure 7B:
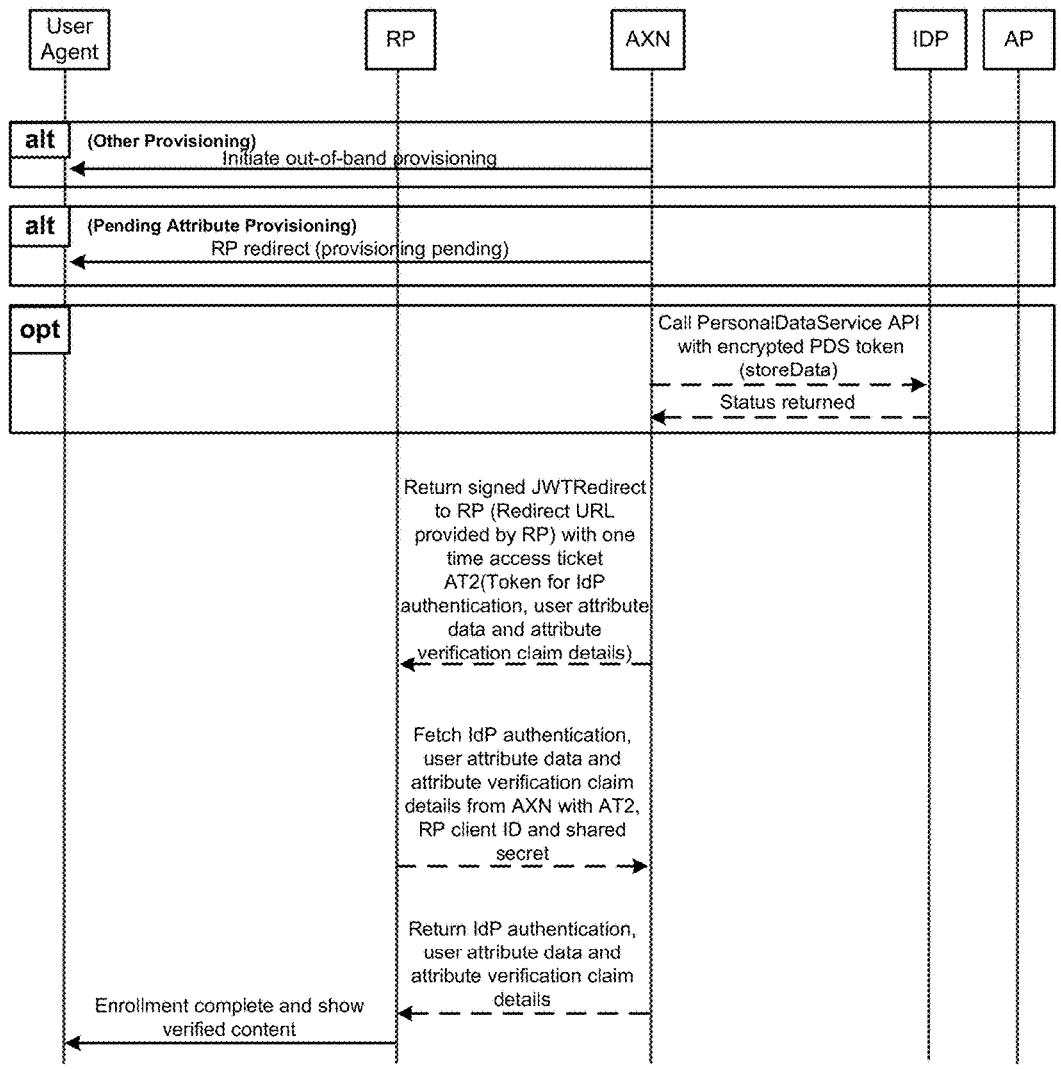

FIG. 7B is a flow diagram showing the AXN creating a PDS for the attributes received as shown in FIG. 7A, and sending a one time access token to the RP indicating that the AXN has the requested information. The RP returns a fetch reply token and the authentication, attribute data and claim details are disclosed to the RP.

Figure 8:
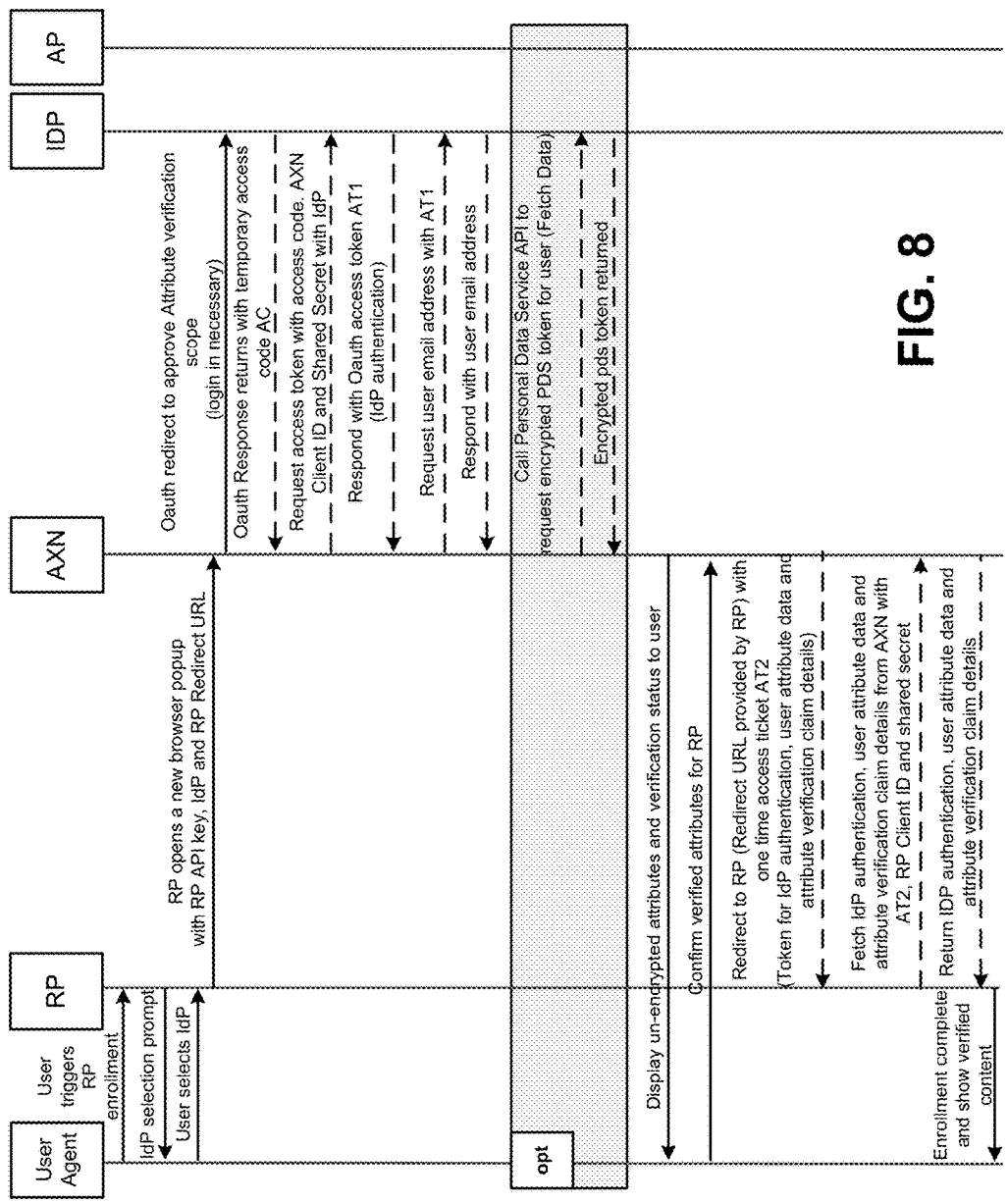
FIG. 8 is a flow diagram illustrating an attribute sharing process according to another embodiment.

FIG. 8 is a flow diagram illustrating an attribute sharing process according to an other embodiment.

In this FIG. 8 embodiment, as in FIG. 5, a user that has previously enrolled with an RP via the AXN is enrolling with a new RP. Here the AXN is acting as a proxy for the IdP and now the AXN, for a new RP where the user wishes to enroll, is acting as an AP by relying on a claim stored at the AXN associated with a previous attribute assertion by the user done for a previous RP. As such there is no AP query step shown. In another embodiment, for example where reuse of claims is contractually prohibited, the AXN would query the AP and receive claims in response as in FIG. 7A.

Since the user is relying on previously asserted and verified attributes, the AXN retrieves them from the PDS and displays them to the end user for confirmation, and then passes them to the new RP. The user doesn't need to reassert attributes if they are still valid.

Where the AXN serves as a proxy for the RP requesting an OpenID credential, unnecessary data exchange is further minimized. In this embodiment the identity of the RP making the request is unknown to the IDP providing the credential or authentication assertion. The IDP establishes a relationship with the AXN, and trusts that the AXN is requesting the credential on behalf of a legitimate RP. This RP anonymity also limits the ability of the IDPs, as was already the case for APs, to correlate the transaction activities of end users.

Figure 9:
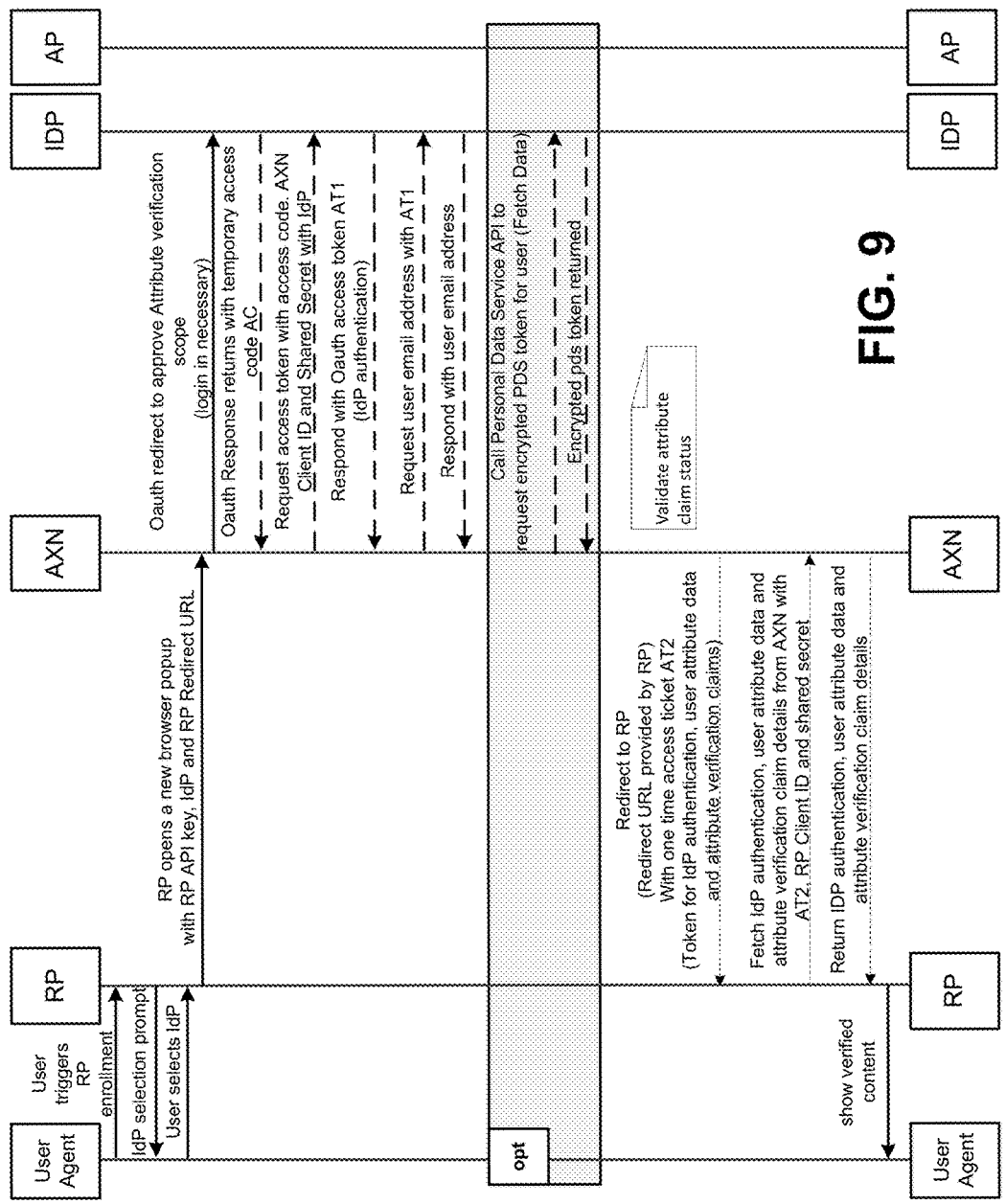
FIG. 9 is a flow diagram illustrating an attribute sharing process according to another embodiment.

FIG. 9 is a flow diagram illustrating an attribute sharing process according to an other embodiment.

As in FIG. 6, in FIG. 9 a user is returning to an RP where they have previously enrolled via the AXN. The user asserts a previously used credential to log in. The AXN is acting as a proxy for the RP with respect to the RP. When the AXN receives an authentication from the IDP, the AXN retrieves the associated PDS and passes the attribute data to the user for confirmation. The end user does not have to reenter attributes if this return to the RP has occurred within the time period before the RP requires a fresh verification claim from an AP.

Users browse to an RP site with the objective of creating a new account (to obtain and/or purchase a service or product offering). The user will use an OpenID issued by their IDP to log into the RP and/or to create a new account. The IDP will request the user's permission to allow the RP to access the User's IDP account information, and the user will opt-in to granting the RP access.

The RP will request the user to assert attributes at the RP site for verification, and the RP site will interface with the AXN-RP application to verify the user-asserted attributes via the AXN. User attribute claims will be stored at the AXN with corresponding meta tags associated with each user attribute.

Verified attributes will be stored in a PDS. RP, IDP, and AP tokens associated with claim processing will be managed and stored for each transaction.

To use the PDS for subsequent new RP sessions, in one embodiment the AXN application at the RP requests the AXN to look up the OpenID and return the token to open the encrypted PDS file. The AXN application and user interface form is populated with only the attributes that have been previously verified and requested by the new RP via the AXN. Additional attributes may be requested/validated if required—alternatively the user hits the submit button to use the existing list of verified attributes. Upon completion of the RP authentication and account provisioning step (using the verified attributes and related claims), the user is prompted to Allow Access to the RP and it's trusted User Verification Service to save the entered information in the encrypted PDS which will be associated with the user's IDP account) for reuse at another RP. Upon completion of the RP authentication and account provisioning step (using the verified attributes and related claims), the AXN will encrypt and save the user information in the PDS for storage with the user's IDP or other location of the user's choosing such as the user's mobile device. The data stored in the PDS is made available to the user to manage their online account relationships and to simplify creating an account with another RP. Current industry IDP OpenID provider practice allows users to cancel RP OpenID access at the IDP. The new flow allows the users to expand the functionality of the user administration console to manage at the attribute level which attributes are shared with each RP where a user has created an account via the AXN.

A user's PII will not be stored at the AXN, but will be under direct user control via the user's PDS at an online location of the user's choice. The user will assert their attributes at RP sites to establish an account and procure services, and after completing their first verification flow, the user can easily leverage verified attributes from their PDS to establish new RP accounts, thereby minimizing user friction and promoting adoption. Throughout this identity ecosystem, the user will be leveraging a credential (e.g., OpenID) issued and managed by their IDP, which minimizes the use of passwords and reduces the friction associated with user account creation and log in.

The AXN design mitigates many potential threats by virtue of not creating a central data store of verified user attributes and instead using PDS s as described. In addition, security and privacy enhancing and protecting technology may be built into the AXN through the use of Oauth 2.0, https for the transport layer, white lists to only allow registered IDPs, APs, RPs and users to access the AXN, and encryption techniques applied to data at rest. The user admin console gets dynamically created on the AXN when users create a new RP account to verify and share their attributes and users can thereby control which of their verified attributes are shared with each of their RP and IDP accounts, and control which of their accounts appear on the console. In one embodiment, if a user decides, for additional privacy or security reasons, to not have an RP appear on the dynamically generated user admin console console, the user could elect while on the console to have the RP display removed. The AXN would store a record of RPs that were designated for removal from appearing, and check against this record before dynamically populating the console in subsequent displays.

The AXN user attribute data exchange with IDPs is limited to an encrypted token indicating that an attribute was verified and available with user consent via the AXN to participating RPs; and the actual verified user attributes are not provisioned directly to participating IDPs by the AXN User data is stored in small user controlled PDSs to avoid data hacks at the AXN. Front side and backside OAuth access tokens act as a type of 'key' that expire and can be revoked by the user or AXN. User claims and tokens to open the PDSs are stored at the AXN but separating the keys from the data makes neither a good data at rest target.

Transport Layer Security (TLS) enables a secured connection, which is encrypted and decrypted with key material until the connection closes to prevent data eavesdropping and tampering.

In an embodiment, an additional layer of security is added in the form of a traffic pattern monitoring system, such as monitoring software at the AXN, that detects, for example, anomalies in the number and/or frequency of visits to the AXN for OpenID credentials from a particular IDP for a particular time period, thereby enabling alerts or other actions in response to suspected hacks of an IDP's OpenID data (i.e. IDP data hack detection via the subsequent use to attempt access to RP accounts via the AXN). A similar system could be implemented at the user level by detecting anomalies in OpenID usage at the particular OpenID credential level.

Users will authenticate to their IDP to use their OpenID credential before initiating an account login with their RP. The AXN will create an account for each user, and will accept the OpenID credential as provisioned by the IDP. The AXN will also implement various verification services and methods that will generate claims associated with each user attribute. In the event of a mismatch of claims during the user log in process to the AXN, the user will not be able to access their user Admin console. In all cases, participating RPs will consume the user-asserted, verified attributes and associated claims to implement user authentication and authorization services prior to provisioning a user account and user access.

The AXN application may be hosted by a cloud provider, such as in the Google App Engine. The AXN is designed to scale as needed. Resources are dynamically allocated based on loading requirements.

The AXN enables two types of revenue generating transactions for attribute exchange services: Scenario 1: New AXN users that want to login to a new RP service. In this transaction, the user wants to use their OpenID credential from their IDP (e.g., Google, Verizon, AOL) to login and subscribe to an online RP service that requires the user to assert attributes (e.g., NEAT) that are verified by third party AP services. The AXN enables the user to securely assert the required attributes, verifies these user attributes through one or more APs, and provisions the verified user attributes to the RP based on the user's permission. Upon receipt of the payment from the RP for the verified user attributes, the AXN can be designed to automatically calculate and distribute appropriate payments to participating APs and IDPs. The AXN user record and the user Attribute Management Console are updated to reflect the verified user attributes distributed to the corresponding RPs and verified by the APs in each transaction.

Scenario 1 resembles the traditional AP fee per transaction model, and the AP would receive a large percentage of this transaction fee, the IDP would receive a small percentage, and the AXN would retain the remainder. The RP makes no additional transaction-based payments when the verified user logs into their RP service and pays the AXN the same fee per user on an annual basis. The AXN could be used to refresh the user attributes for the RP during the annual subscription contract when the user logs into the RP service, provided the user does not deny permission for the RP to continue receiving updates.

Scenario 2: Existing AXN users with verified attributes that want to login to a new RP service. In this transaction, the user wants to use their OpenID credential from their IDP to login and subscribe to an online RP service that requires the user to assert attributes already verified by third party AP services. In this case, the AXN provisions the verified user attributes to the RP with user permission. Upon receipt of the payment from the RP for the verified user attributes, the AXN distributes the appropriate payments to participating RPs and IDPs. The AXN user record and the user Attribute Management Console are appended to include the verified user attributes distributed to the corresponding RPs, and verified by APs in each transaction.

Scenario 2 provides a 'network effect' for participating APs who verify user-asserted attributes on the AXN. As existing users with verified AXN attributes sign up for new RP services using their OpenID credential, the user account creation and login is simplified, and the new RP pays the AXN the annual service fee for that user's verified attributes. The original AP used to verify the corresponding user attributes receives a small percentage of this new RP account transaction, the IDP would receive a small percentage, and the AXN would retain the remainder.

In Scenario 2, as users sign up for new RP account services, Scenario 2 creates an annual royalty revenue stream for APs and IDPs participating on the AXN, and potentially generates more AP revenues than on a per transaction pricing model.

The user's PDS is retrieved after the user initiates a browser session to log in to any RP that has registered with the AXN by selecting a previously asserted credential from the IDP options presented via IDP selector buttons, aka NASCAR buttons, on the RP log in page. Upon acknowledgment of a successful credential assertion, the user's retrieved PDS. Is coupled with the claims record using the PID, or in another embodiment the PDS is coupled with the claims record using the associated MBUN. The key to open the encrypted PDS token is stored at the AXN and can be accessed using the MBUN associated with the user's OpenID IDP account (user's credential) at the AXN. As required by the RP, the user attributes can be re-verified via the AXN with an AP at that time, and the updated verified claims would be presented to the RP. The frequency of user-asserted attribute claims verification is specified by the RP at registration based on their security and authorization requirements as part of their risk/cost trade-off assessment. The RP can modify the frequency of claims verification via the RP Management Console.

Figure 10:
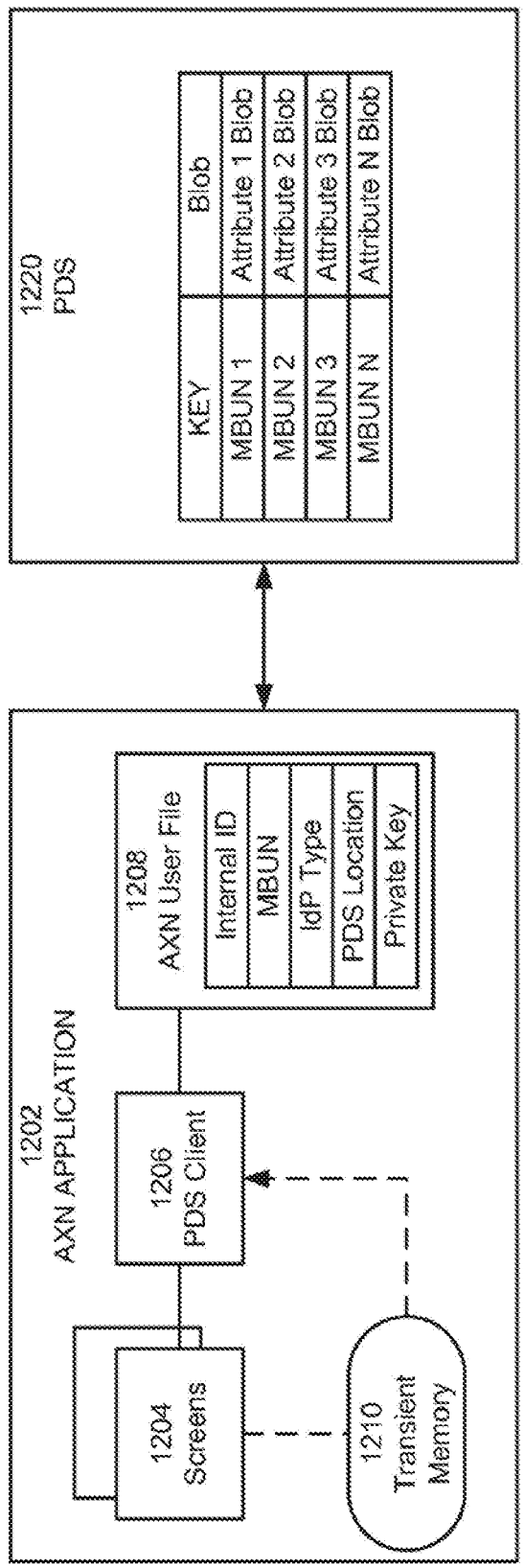
FIG. 10 is a block diagram illustrating an embodiment of an AXN for generating a PDS (Personal Data Service) according to an embodiment.

FIG. 10 is a block diagram illustrating a process for generating a PDS according to an embodiment.

FIG. 10 illustrates an embodiment of an AXN application 1202 used to create a PDS 1220. New attributes are received at the AXN application 1202 via a PDS client 1206 and converted to a data structure of name-value pairs (Block 1208), for example a java script object notation (JSON). This may then be encrypted, as with an AES 256 private key, and may also be url encrypted. The PDS 1220 record is found via an MBUN. Data is decrypted with a single key per MBUN. The data from screens 1204 is held in transient memory 1210 and passed to a PDS client 1206. The data is not stored permanently by the AXN.

According to embodiments hereof, the AXN implements three different types of PDS the PII PDS, the Preferences PDS, and the Enterprise PDS. Each type of PDS services a different set of requirements.

The PII PDS is used to store the user-asserted, verified attributes that have been bound to an OpenID. This process requires the user to enter the requested attribute information via screens 1204 and may optionally require an out of band PIN by voice or digital SMS that is sent to a phone number in a CORS webpage at the RP. Optionally this pin can be sent using postal mail to the user's address and entered asynchronously.

The Preference PDS relies on the fact that the PII PDS validation process has been completed successfully. The Preference PDS is linked to the user's PII PDS using the PID or alternatively an MBUN. It is used to capture user preferences such as when, where and how to contact the user, such as by phone or email, the preferred time of contact, the permissible purposes for contact, and the specific circumstances as applicable to the RP service. These attributes are preferences and therefore not required to be verified.

During Registration each RP will select which "User Preferences" they would like displayed in order to receive input from their user/customers. The AXN would display these User Preferences to users (who now have verified attributes and a user account with the RP) via the MAX User Managed Admin console (user admin console) interface. Each participating RP would display this button on their site (in addition, users could access this via an applet, link or designated site), and their user/customers will select their attribute preference settings from the MAX interface for User Preferences.

The Enterprise PDS also relies on the fact that the PII PDS validation process has been completed successfully. The user goes to the enterprise page and passes the PII verified attributes via a pre-established API call. The Enterprise captures this information, may ask for additional knowledge based questions and then upon successful verification with the Enterprise directory, stores information such as additional Enterprise employee information in the Enterprise PDS. An Enterprise PDS may include data such as an employee ID number, job title, badge number, business unit or project number. The primary use of the Enterprise PDS is to bridge access across different Enterprise RP services.

The user initiates the retrieval of the PDS. In the case where the RP wants to use information stored in the Preferences PDS or the Enterprise PDS to return to the RP site, they must initiate out of band contact to notify the user to return to the RP and initiate the retrieval process of the PDS.

|  | Validated by | | | | |
|---|---|---|---|---|---|
| PII PDS | Commercial AP | Commercial IDP | Commercial IDP or user device | User | User |
| Preferences PDS | Not Applicable | Commercial IDP | Commercial IDP or user device or RP | User | User |
| Enterprise PDS | Enterprise and/or Commercial AP | Enterprise of Commercial IDP | Enterprise or Commercial IDP | Initially User followed by Enterprise entering select corporate data | User and Enterprise |

A user interface form, also called a verification form when submitting Pii, is generated in a secure browser session and is populated from the PDS (securely decrypted in the browser for viewing by the user) with only the attributes that have been previously verified via the AXN and as requested by the new RP via the AXN.

Once the user completes the PII verification flow and gives permission to share their attributes with an RP to create an RP account, the user will be sent an email with a link to a user admin console, or MAX, and/or would be able to access MAX via a link on the RP site available upon authentication at the site, where the user will select their attribute preferences. Once the user has selected their attribute preferences on MAX and given permission for these preferences to be shared with the RP, the AXN will send these preferences (tagged by the User's OpenID credential or a corresponding unique identifier) in the form of a PDS to the RP so these user preferences can be stored in the corresponding RP user account or RP CRM system. When a user updates their preference settings at MAX, the AXN will send the updated PDS data to the RP. These user preferences would not be verified attributes, but would provide the user (via MAX) the ability to manage their preferences with each RP.

To initiate the RP login, a user navigates via their browser to an RP service. At the RP service the user selects an IDP to login from a list of IDP selector buttons, also referred to herein as NASCAR buttons, that represent each registered IDP capable of providing a level of assurance (LOA) sufficient to meet or exceed the RP service requirements. The user chooses a NASCAR button for an IDP with whom they have a pre-existing credential, and then is redirected through the AXN to login with the IDP. The AXN creates a table entry of the corresponding RP service session and ties it to a one-time use ambiguous session identifier that is provided to the IDP as the user session is sent to the IDP to login for authentication using the appropriate LOA credential.

For the purpose of obscuring the IDP's knowledge of the user's activity with the RP from which the session originated, the AXN serves as a user login proxy between the RP and IDP. The AXN uses a dynamic and fully ambiguous one-time session identifier within token exchange to follow the user's login experience from the time he/she chooses to use a third party credential for authentication until he/she is returned to the RP service for authorization. Other systems will use a static ambiguous identifier for both the RP service and the user. A solution using static ambiguous identifiers still potentially allows the IDP to gain information about the number of RP services accessed and the related user account activity. The current design enables the AXN to fully obscure a user's RP service activity from the IDP.

Upon completion of the user's authentication by the IDP, the IDP transfers the results of the user's authentication assertion to the AXN, including the ambiguous session identifier. The AXN uses this ambiguous session identifier to map to the user's earlier RP NASCAR button request and transfers the user's session back to the RP service with a token that includes the earlier session identifier and the authentication assertion. The AXN acts as the "delivery service"—at no time does the AXN, decrypt, access, or review the authentication assertion. Next, the AXN sends a one-time use token during the session to notify the RP service to retrieve an encrypted token from the AXN that contains: any verified user-asserted attributes; verification claims; the Authentication Assertion; and, any attributes associated with an IDP credential that the AXN has collected from the IDP authentication process flow. These IDP credential related attributes are specified by the IDP credential scheme (e.g., OpenID Connect, SAML 2.0 or IDI) and will be used by the RP service as additional information to make an authorization decision. In another embodiment, to achieve data minimization, the AXN can only pass the authentication of the credential, while dropping additional information that the RP does not need to make an authentication decision.

Most credentials, including OpenID 2.0, rely on a unique identifier to identify a user to all RPs. That unique identifier can be considered Pii. To avoid the unnecessary exchange of Pii, in an embodiment the AXN service will create a different identifier for each user at each RP. Once a NASCAR button is chosen, the RP Application will forward in an encrypted token, a unique session identifier and the RP Application static registration ID to the AXN. The AXN stores the session token with the RP Application registration ID and creates a single use ambiguous identifier to place in a token before forwarding the session to the IDP along with the RP Application LOA requirement. This is the proxy function that enables the RP application to remain anonymous to the IDP. The user remains within the IDP Window until the login process is successfully completed by the Third Party provider (IDP). The RP Application is still present in a second window. A failure to complete the login process with the Third Party provider does not require the user to navigate back to the RP Application a second time, the RP Application is still present on the user desktop. Successful authentication results in the IDP sending a token string back to the AXN (for example Oauth or SAML based). The IDP also returns a one-time use ambiguous ID for the AXN to forward the authentication assertion back the correct RP Application session by matching the ambiguous ID to the session token from the RP Application. The AXN returns the JEU to the correct RP Application and the specific session.

In another embodiment the AXN modifies the original data flow further at this point. The AXN does not use the customer's session to pass data about the user. It reduces the risk of a "man in the middle" attack to obtain details of the customer by separating the transmission of the authentication assertion and the customer data. The AXN can send the authentication assertion within the end user session, but it also includes a one-time use token for the RP to retrieve the attributes (attribute retrieval token or retrieval token). Additional elements that could be included in the retrieval token are any user asserted attributes and/or any attribute verification data that may be been collected.

---

Web Sequence Diagram Scripts
The following scripts are further descriptive of the system and methods described above and illustrated in the communication diagrams above.
First Time User Enrolling with RP and AXN:
title First time user enrolling with RP and AXN \n \n
participant "User\nAgent" as user
participant "User\nAgent" as user
participant AXN as axn
participant IDP as idp
participant AP as ap
user->rp:User triggers RP enrollment
rp->user:IDP selection prompt
user->rp: User selects IDP
rp->axn:RP opens a new browser popup with RP API key, IOP and RP Redirect URL
axn->idp: OAuth redirect to approve Attribute verification scope \n (login if necessary)
idp->user: Prompt user to consent AXN for email address access, attribute verification and management
user->idp: Authorization granted for AXN for email address access, attribute -continued verification and management
idp-->axn: OAuth Response returns with temporary access code AC
axn-->idp: Request access token with access code, AXN Client ID and Shared
Secret with IDP
idp-->axn: Respond with OAuth access token ATI\n(IDP authentication)
axn-->idp : Request user email address with ATI
idp-->axn: Respond with user email address
axn->user: Display attribute verification fonn (based on RP client id)
user->axn:Add attributes in the attribute request form
note over axn:detennine contracted AP\n according to AXN rules
axn->ap: Verify attributes
ap->axn:attributes verified by AP
note over axn:verification claim saved
alt Other Provisioning
axn->user: Initiate out-of-band provisioning
end
alt Pending Attribute Provisioning
axn->user:RP redirect (provisioning pending)
end
opt
axn-->idp: Call PersonalDataService API\n with encl)'pted PDS token \n
(storeData)
idp-->axn: status returned
end
axn-->rp:Redirect to RP (Redirect URL provided by RP) with one time access
ticket A T2 \n (Token for IDP authentication, user attribute data and attribute verification
claim details)
rp->axo: Fetch IDP authentication, user attribute data and attribute verification
claim details from AXN \nwith A T2, RP Client ID and shared secret
axn-->rp: Return IDP authentication, user attribute data and attribute verification
claim details
rp->user: Enrollment complete and show verified content
Existing AXN User Enrolling with New RP:
title Existing AXN user enrolling services at new RP\n \n
participant "User\nAgent" as user
participant RP as rp
participant AXN as axn
participant IDP as idp
participant AP as ap
user->rp: User triggers RP enrollment
rp->user:IDP selection prompt
user->rp: User selects IDP
rp->axn:RP opens a new browser popup \n with RP API key, IDP and RP
Redirect URL
axn->idp: OAuth redirect to approve Attribute verification scope \n (login if
necessary)
idp-->axn:OAuth Response returns with temporary access code AC
axn->idp: Request access token with access code, AXN Client ID and Shared
Secret with IDP
idp->ax.n: Respond with OAuth access token ATI \n(IDP authentication)
axn-->idp: Request user email address with ATI
idp-->ax.n: Respond with user email address
opt
ax.n-->idp: Call PersonaiDataService API to\n request encrypted pds token for
user (fetchData)
idp-->ax.n: encrypted pds token returned
end
axn->user: display un-encrypted attributes and verification status to user
user->ax.n:confirm verified attributes for RP
ax.n-->rp:Redirect to RP (Redirect URL provided by RP) with one time access
ticket AT2 \n (Token fQr lOP authentication, user attribute data and ~ttribute verification
claim details)
rp-->axn: Fetch IDP authentication, user attribute data and attribute verification
claim details from AXN \n with A T2, RP Client ID and shared secret
ax.n-->rp : Return IDP authentication, user attribute data and attribute verification
claim details
rp->user:Enrollment complete and show verified content
Returning RP User Enrolled Via AXN:
title Returning RP user enrolled via AXN \n \n
participant "User\nAgent" as user
participant RP as rp
participant AXN as axn
participant IDP as idp
participant AP as ap
user->rp:User access RP services
rp->user:IDP selection prompt
user->rp: User selects IDP
rp->axn:RP opens a new browser popup for AXN \nwith RP API key, lOP and RP
Redirect URL

```
axn->idp: OAuth redirect to approve Attribute verification scope \n (login if
necessary)
idp->axn:OAuth Response returns with temporary access code AC
axn-->idp: Request access token with access code, AXN Client ID an.d Shared
Secret with IDP
idp->axn: Respond with OAuth access token ATt\n(IDP authentication)
axn-->idp : Request user email address with ATI
idp-->axn: Respond with user email address
opt
axn-~>idp: Call PersonaiDataService API to\n request encrypted pds token for
user (fetchData)
idp-->axn:encrypted pds token returned
end
note right ,of axn: validate attribute claim status
axn-->rp:Redirect to RP \n(Redirect URL provided by RP) \n with one time
access ticket A T2\n (Token for IDP authentication, user attribute data and attribute
verification claims)
rp-->axn: Fetch IDP authentication, user attribute data and attribute verification
claim details from AXN \n with A T2, RP Client ID and shared secret
axn-->rp : Return IDP authentication, user attribute data and attribute verification
claim details
rp->user:Show verified content
```

In an embodiment, a returning user with verified claims stored in a PDS is enrolling at a new RP, a request is sent from the AXN to the selected IDP with an access code, an AXN client ID and a shared secret (between the AXN and IDP). The AXN then receives an access token ATI with an authentication assertion from the IDP. The AXN then sends a request for an encrypted PDS token associated with that user. In the diagrams the PDS is stored at the IDP, but it could be stored elsewhere such as on a device owned by the user. It is also worth noting that the IDP and AP could be the same entity. Once the AXN receives the encrypted PDS token it passes a token A T2 to the RP with the authentication assertion, the attribute data and the attribute verification claim. It may alternatively be the case that, when enrolling at a new RP, the AXN queries an AP for a new verification claim, rather than re-using the previous claim. In this case the data flow would include a verification request from the AXN to at least one AP as was previously shown with a new user enrolling for the first time with a registered RP. The AP would send a claim back to the AXN. The AXN would send notification to the RP, and the RP would send a retrieval request to the AXN to receive the claim.

In another alternate embodiment where it may be desirable to an RP to have the ability to pass through (i.e. delegate) an authorization decision while keeping user attributes separate for another party to consume, it is possible to pass separate tokens back to the RP with the information (authorization assertion versus attributes or attribute verification) separated accordingly. In the communication diagrams above, token AT2 would still be used for receiving the authentication assertion, and another token A T3 would be used for receiving attribute data and/or attribute verification claims.

User Credential Linking

Figure 11:
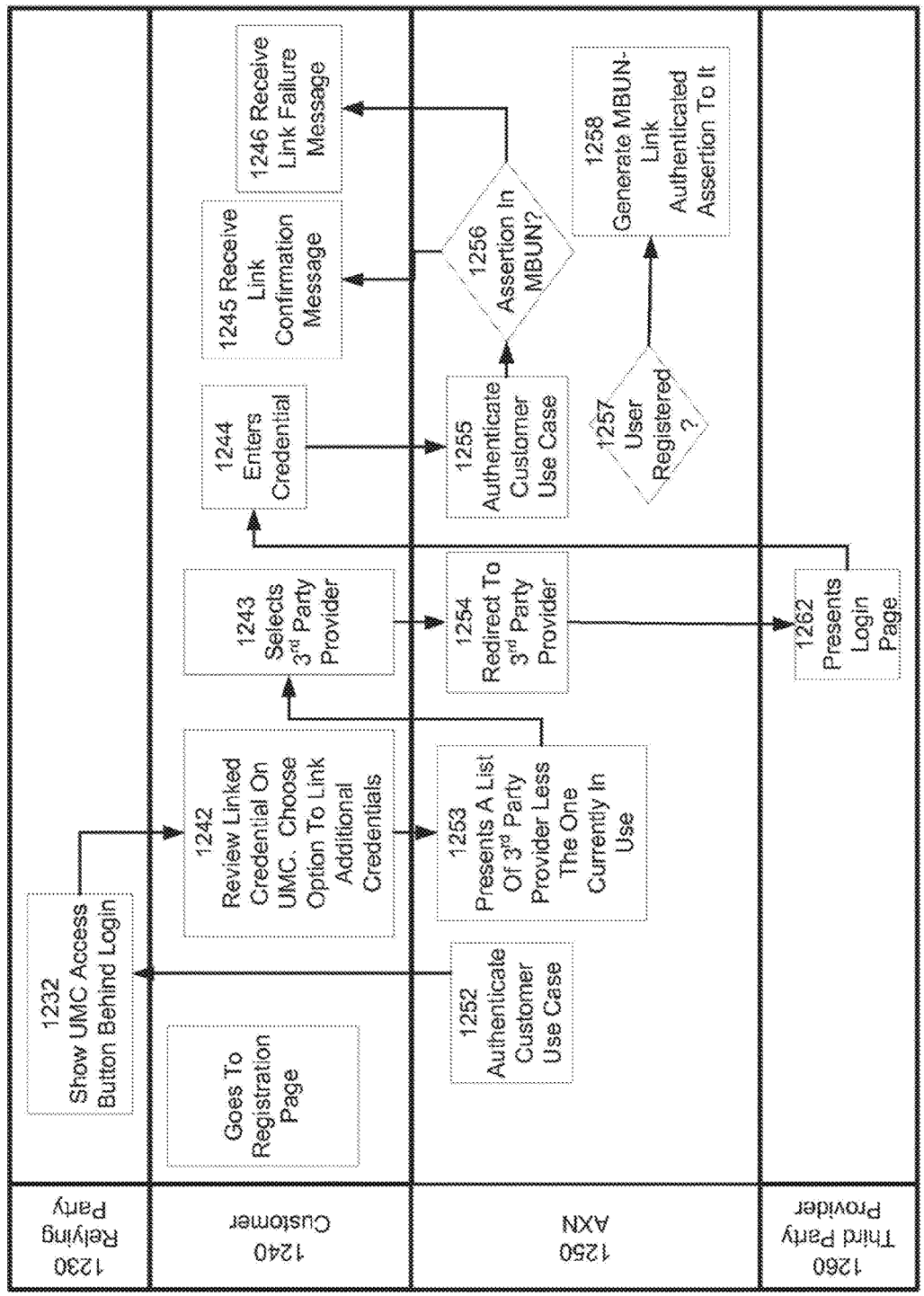
FIG. 11 illustrates a process by which an AXN permits multiple credentials to be linked according to an embodiment.

FIG. 11 illustrates a process by which an AXN permits multiple credentials to be linked according to an embodiment.

To link credentials, a user 1240 accesses the user admin console, described here as UMC at 1232. AXN 1250 authenticates customer use case at 1252. A user 1240 can review linked credentials and chooses an option to link credentials at 1242. The user 1240 is then shown a list of third party provider 1260 (IDP) options, such as IDP selector buttons, at 1253. At 1243 the user 1240 selects a third party provider 1260 and is redirected at 1254 to that party's site, where the user 1240 is prompted to log in at 1262. The user 1240 enters the credential at 1244. The authentication occurs at 1255, and the authenticated credential is then linked to the appropriate MBUN at 1256. At 1257, if user 1240 is registered, ANX at 1258 generates MBUN and links authenticated assertion to it. Either a confirmation message is sent at 1245, or a failure message is sent at 1246.

To enhance the customer experience, the AXN 1250 provides a desirable service to RPs 1230 and customers where the AXN 1240 links multiple credentials from third party providers 1260, for one customer 1240, to one AXN identity. For example, if a customer 1240 has a Google, a PayPal and a Verizon credential and chooses to use any one of them when logging into a RP 1230, the AXN 1240 would be able to tell the RP 1230 that all three credentials are, in fact, related to the same customer 1240. If opted for, all credentials for the customer are linked to a common identity in the AXN 1240. The AXN 1240 has then linked multiple credentials to the same customer.

The UMA console displays attributes associated with one IDP credential unless the user chooses to link their IDP credentials to display a consolidated view their collective set of IDP PDS information within the UMA interface. Linking credentials creates an association of MBUNs, but it does not consolidate multiple MBUNs, within the AXN. The advantage of linking credentials is that the user gains the ability to alternate between IDP issued credentials when accessing an RP service, if the credentials are of equal or greater LOA than required for the RP service. A lower LOA, a "LOA 1", authentication provided by OpenID 2.0 will not be used to give a user access to another RP service with a higher LOA requirement, a "LOA 2 or LOA 3", even if the accounts are linked.

The linking and unlinking of multiple user IDP credentials is performed by the user on the UMA console. The AXN does not automatically link credentials. If an IDP credential is determined to be no longer valid, the AXN will globally remove the IDP and all the IDP credentials from the UMA access list. If the user unlinks all of their credentials in the system so that none of them are active, their AXN MB UN, used to link credentials, will automatically be disabled and archived. If an MBUN is disabled or archived and should the user return to an RP service and re-assert their IDP credentials for login, they will be treated as a new user on the AXN.

There is no mechanism for the Customer to access the AXN directly to "pre-register" an IDP Credential for future use. The Customer is never given their MBUN. The AXN will assign an MBUN to each authenticated credential that has been used at a compliant RP site. This supports data minimization in that we only collect credentials that are actively being used. In addition, if the user does not access the system using a credential (or linked credential) for a configurable period e.g. greater than 1 year, the credential MBUN will be disabled and the user will be required to re-assert through the process as a new user.

The AXN may include a conversion interface for RPs that rely on one credential type to rely on credentials of another type, for example SAML based RPs could convert to IdPs leveraging OpenID in the support of LOA 1 and LOA 2 credentials. If, for example, a third party provider uses OpenID and the RP service prefers to receive SAML or REST/JSON, an AXN conversion interface will facilitate the transition.

The AXN has a unique method for users to manage the attribute data that is shared with RPs. The AXN renders a UMA console via a secure browser interface to each authenticated user. The UMA console is accessible from inside any RP service using disparately maintained keys and allows users to manage their online use of credentials and attributes for each RP service where the user has an account. The third party IdP that issued a user's credential will be the default location where the associated PDS will be stored. The PDS may be an encrypted binary large object (blob) that contains the user-asserted attributes that can only be opened by combining a token that is created by the user when he clicks on the UMA console link located on RP sites registered with the AXN, while the other component of that key is retained ! by the AXN. Optionally the user's PDS can be stored in any alternate location providing that it can be retrieved by the AXN during an online session. The UMA console enables users to review and control the PDS attributes that have been shared with each RP service that was accessed with an IdP credential.

In an embodiment, the AXN does not enable any visibility by an IDP or other third party as it relates to user transactions. The AXN admin console for the RP Service only exposes the transaction detail for that specific RP Service. The PDS is accessed by the user from an RP Service, i.e. only while logged in to a registered RP, using the UMA Console link that redirects to a dynamic session hosted on the AXN. In an embodiment the PDS may be created by the AXN as an encrypted blob using MD5, a widely used cryptographic hash function that produces a 128-bit (16-byte) hash value. This blob may be coupled with the two private keys for each displayed PDS to ensure that neither the IdP nor the RP service can access the details when viewed in the dynamically generated UMA console even when the user has linked multiple third party credentials within their UMA console. The user can only access the UMA from within an RP service to which they have been authenticated using an IdP credential so the user is not provided an option to log onto the AXN directly.

A third party credential can only be added to the AXN and the UMA console by a user invoking the process to use that credential to log into an RP service. The AXN does not provide a mechanism to add credentials that are not currently being used on the AXN. There is no pre-loading of IdP credentials into the AXN, and therefore there is no need for the user to decline registration of their credentials with AXN. Users do not login to the AXN directly to reach the UMA console since this is only accessible via an RP service. As a result, there is also no need for the user to know his/her unique AXN MBUN.

A claims verification response (for each user-asserted attribute) must be returned to the RP for the attributes required, regardless of the claim result (pass or fail). User asserted attributes that fail on first attempt will immediately present the user with one additional opportunity to re-enter the specific attribute that failed. If the attribute fails a second time with the same RP service session, then, based on RP account settings (at the RP Management Console), a second AP service may be deployed to verify the attributes.

Additional PDS data elements include the MBUN for purposes of identifying and opening the PDS and the user asserted attributes that were verified. The IdP credential used could also be stored in the PDS. While, in one embodiment the AXN verification logic uses the most current set of claims, the AXN maintains all claim history associated with a user credential to support AXN operational and audit functions. In another embodiment, where the user is asserting previously verified claims at a new RP site, the AXN queries an RP-selected AP for a verification claim. This is typically a requirement of the APs, as they derive revenue from the data verification and often prohibit the reuse/sharing of claims among RPs. All current claims are passed to the RP as appropriate, even in cases of overlapping service offerings; regardless of claim status (pass or fail) so that the RP can use this information to make authentication and authorization decisions.

A user's PII will not be stored at the AXN, but will be under direct user control via the PDS at an online location of the user's choice. The user will assert his/her attributes at RP sites to establish an account and procure services, and after completing the first verification flow, the user can easily leverage verified attributes to establish new RP accounts, thereby minimizing user friction and promoting adoption. Throughout this identity ecosystem, the user will be leveraging a credential (e.g., SAML, 101, OpenID) issued and managed by their IdP, which minimizes the use of passwords and reduces the friction associated with user account creation and log in.

After a customer (user) selects an IdP (Third Party Provider) credential to access the agency RP service, the customer is presented a login page by the IdP (Block 1262) to enter their credentials (Block 1244). At this point, the IdP authenticates the customer's credentials (Block 1255). Once the IdP authenticates the customer, an authentication assertion is created by the IdP that is relayed by the AXN, and eventually received by the customer's web browser to be sent to the RP in a subsequent use case.

In one embodiment, when an RP registers at the AXN, they select which IdP credentials can be consumed for their RP service. The AXN provisions a row of NASCAR buttons (with approved IdP login options) for the RP based on their settings in the RP Management Console. Once an IdP NASCAR button is selected by the customer, the RP service will forward an encrypted token, a unique session identifier, and the RP service static registration ID to the AXN. The AXN stores the session token with the RP service registration ID and creates a single use ambiguous identifier to place in a token before forwarding the session to the IdP along with the RP service LOA requirement This is the proxy function that enables the RP service to remain anonymous to the IdP. The customer remains within the IdP window until the login process is successfully completed by the Third Party Provider (IdP). The RP service is still present in a second window. A failure to complete the login process with the Third Party provider does not require the customer to navigate back to the RP service a second time, the RP service is still present on the customer's desktop. Successful customer authentication results in the IdP sending a token back to the AXN using, for example, an FICAM approved scheme, OAuth or SAML. IMI may be included if PIV card specific data is used during the authentication process. The IdP also returns a one-time use ambiguous ID for the AXN to forward the Authentication Assertion back the RP service session by matching the ambiguous ID to the session token from the RP service. Similarly, the AXN returns the customer to the correct RP service and the specific session.

In one embodiment, the AXN does not use the customer's session to pass attribute data about the customer. The proposed AXN flow reduces the risk of a "man in the middle" attack to obtain details of the customer by separating the transmission of the Authentication Assertion and the customer data. The AXN can send the Authentication Assertion within the customer session, but the AXN flow also includes a one-time use token for the RP to retrieve the customer Attributes associated with the assertion. The AXN requires the RP service to use the one-time use token provided to retrieve the customer data using an asynchronous session. The data will be passed via the defined scheme for the RP. Additional customer data elements that could be included in the retrieval token are: 1) any customer asserted attributes, and 2) any attribute verification data (claims) that may be been collected.

In another embodiment, the third party provider (IdP) has sent the AXN the customer authentication assertion. The RP will map assertion data to local customer accounts. The access request of the customer is permissible based upon application access policies.

The AXN relays authentication assertion to the customer browser.

The customer browser posts the authentication assertion to RP.

Successful authentication results in the IdP sending a token back to the AXN. The IdP closes the window and returns the one-time use ambiguous ID to the AXN to forward the Authentication Assertion back to the correct RP service session. This enables the AXN to match the ambiguous ID to the session token from the RP service. The AXN returns the customer to the correct RP service and the specific session. Neither the customer nor the browser are required to post the authentication decision to the RP as this has been accomplished automatically.

To enhance the customer experience, in an embodiment the AXN may provide a desirable optional service to RPs and customers where the AXN links multiple credentials from third party providers (IdPs) for one customer to one AXN identity. For example, if a customer has a Google, a PayPal, and a Verizon credential and chooses to use any one of them when logging into a RP, the AXN would be able to tell the RP that all three credentials are, in fact, related to the same customer.

A customer would access the AXN User Managed Admin (UMA) console in the AXN to link credentials. There is no mechanism for the customer to access the AXN directly to "pre-register" an IdP Credential for future use, and the customer is never given their MBUN. The AXN will assign an MBUN to each authenticated credential that has been used at a RP site. This supports data minimization in that the AXN only collects credentials that are actively being used. In addition, as an option, if the customer does not access the system using a credential (or linked credential) for a configurable period (e.g. greater than 1 year), the credential MBUN may be disabled and the customer will be required to re-assert through the process as a new customer.

The AXN provides a desired customer experience in a unique and secure manner using the UMA console (user admin console) that is accessible from an RP service site after the customer has completed an IdP authentication. The UMA console does not appear as a service to the customer until after the customer is successfully authenticated with an IdP credential and authorized access to an RP service. Once logged in to an RP service, the customer can access the UMA console and choose to link their existing IdP credential to another. The customer is presented a set of IdP NASCAR buttons with which they can choose to link their existing login credential. For example, the customer could select an IdP with a different LOA credential that they have used previously to access an RP account via the AXN. Once the customer successfully authenticates using the new IdP credential, the AXN links the second IdP to the IdP credential used to first authenticate the customer in the current RP session.

In an embodiment the AXN UMA console allows the customer to unlink credentials they have linked to access any RP service that has registered with the AXN. Unlinking the credential will disable the customer's ability to use the credential interchangeably at an RP site.

The UMA console is accessible from the RP service site after the customer has completed an authentication. The RP service redirects the authenticated customer to the AXN where a dynamic session is assembled. The customer is presented with the UMA console screen that lists linked IdP credentials and the RP services. The customer can choose to unlink individual IdP credentials.

In one embodiment an attribute exchange occurs in a front-channel model. Attributes required by the RP are delivered as part of the authentication assertion by the third party providers (IdPs) through the AXN during the authentication process. The types of attributes being exchanged are determined at the time of integration between third party credential provider (IdP) and the AXN, and require user opt-in and notice. The attributes provided by the third party credential provider are embedded in the authentication assertion.

There is a one-time use key for the RP to retrieve the Attributes associated with the assertion in the encrypted token that includes the session details and the Authentication Assertion. The expectation is the RP service will immediately retrieve these attributes to support the RP service Authorization decision.

The AXN does not use the customer's session to pass data about the customer. The AXN requires the RP service to use the one-time use token to retrieve the data via an asynchronous session. The data will be passed using the defined scheme for the RP. Additional elements that could be included in the retrieval token are: 1) any customer asserted attributes; and 2) any collected attribute verification data. This process of separating the transmission of the Authentication Assertion and the customer data using a second asynchronous session increases the security and reduces the impact of a "man in the middle" attack.

In cases where an IDP may pass attributes along with the credential authentication, the AXN can verify attributes used in the Credential (Authentication Assertion) process and passed to the AXN by the IdP. This is accomplished by asking the customer to opt in to having their attributes verified after being authenticated by the IdP and before they are returned to the session on the RP. Attribute verification options include: 1) self-asserted attributes, 2) prefill attributes from a masked version of the attributes received from the IdP; and/or 3) the request of attributes outside the SAML/OpenID Scheme. The Attributes are encrypted and staged for the RP service to retrieve from the AXN along with the claims (Pass/Fail) associated with the attributes' assertions.

In another embodiment the attribute exchange occurs in a back-channel model. The RP initiates the attribute request to the AXN, the AXN determines the appropriate AP, and requests the attributes directly.

When an RP service is registered on the AXN, they can designate customer attributes required (to authorize customer access to their RP service) from outside of the credential scheme in addition to attributes that may be readily available from the IdP as part of the Authentication Assertion. This can be accomplished by asking the authenticated user to assert these attributes via the AXN, or opt in to having their attributes verified via appropriate attribute providers. The list of which attributes and the frequency with which these attributes are verified are defined in the RP service registration process. Multiple AP sources can be used to verify customer attributes depending upon the requirements. The AXN attribute verification process can leverage: 1) customer-asserted attributes, and 2) prefill a filtered list of the attributes received from the IdP in conjunction with the credential Authentication Assertion. For customer PII, credit bureau and data aggregator APs are available on the AXN; authoritative agency, enterprise or credentialing AP data sources would also register on the AXN to enable real-time customer ABAC assertions. The verified attributes are encrypted and staged for the RP Application to retrieve along with the claims (Pass/Fail) associated with the attribute assertions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The various participants, including the IDP 110, the AP 115, the RP 130 and the user 102 may perform operations computing devices (such as computers) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

Figure 12:
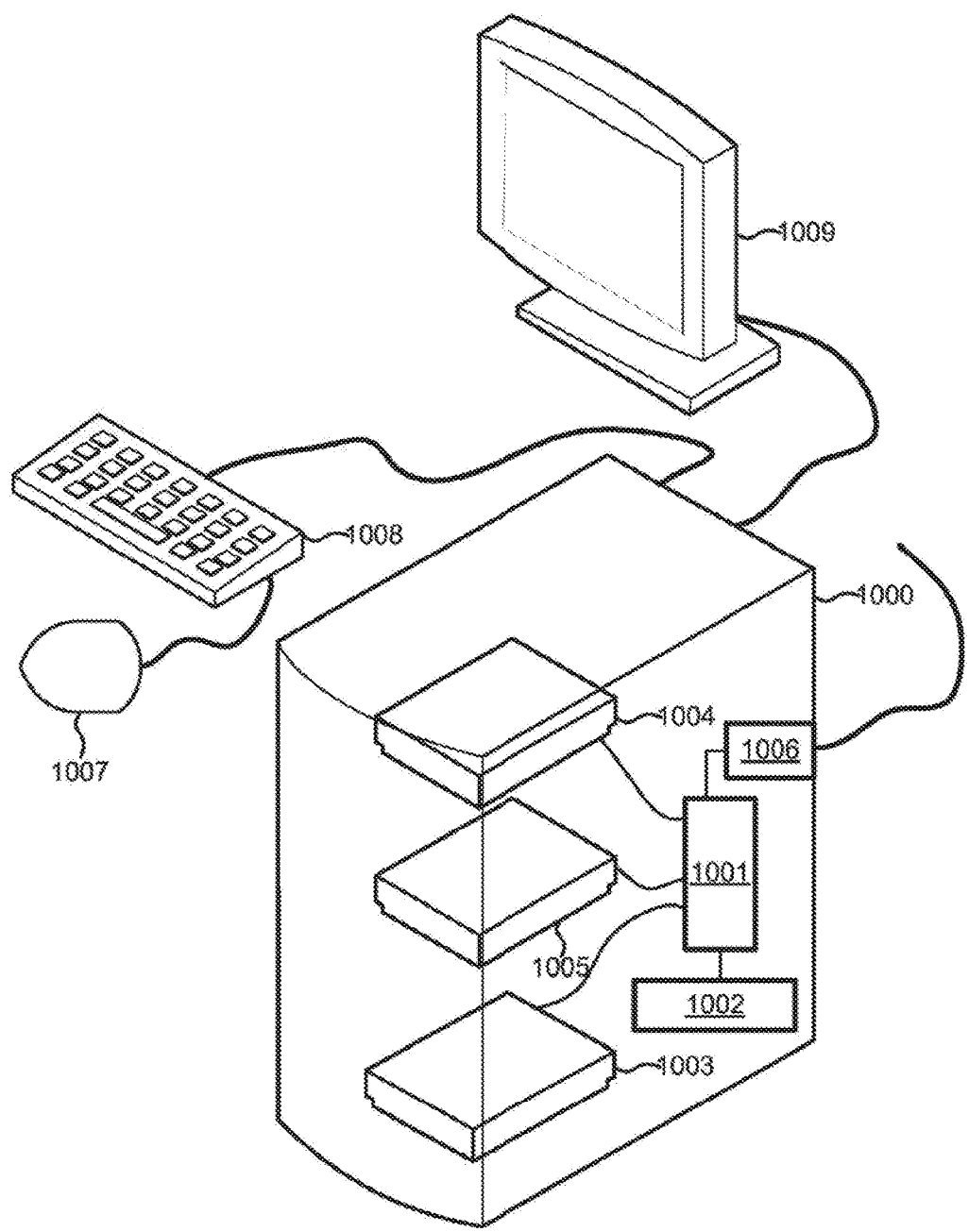
FIG. 12 is a system block diagram of a computing device suitable for use with any of the embodiments.

FIG. 12 is a block diagram of a computing device suitable for use with any of the embodiments. Such a computing device 1000 typically includes a processor 1001 coupled to volatile memory 1002 and a large capacity nonvolatile memory, such as a disk or solid state flash drive 1003. Typically, software applications may be stored in the internal memory 1002 before they are accessed and loaded into the processor 1001. The processor 1001 may include internal memory sufficient to store the application software instructions.

The computing device 1000 may also include a flash drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or Fire Wire® connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, a tablet, a smart phone or a personal data assistant.

Figure 13:
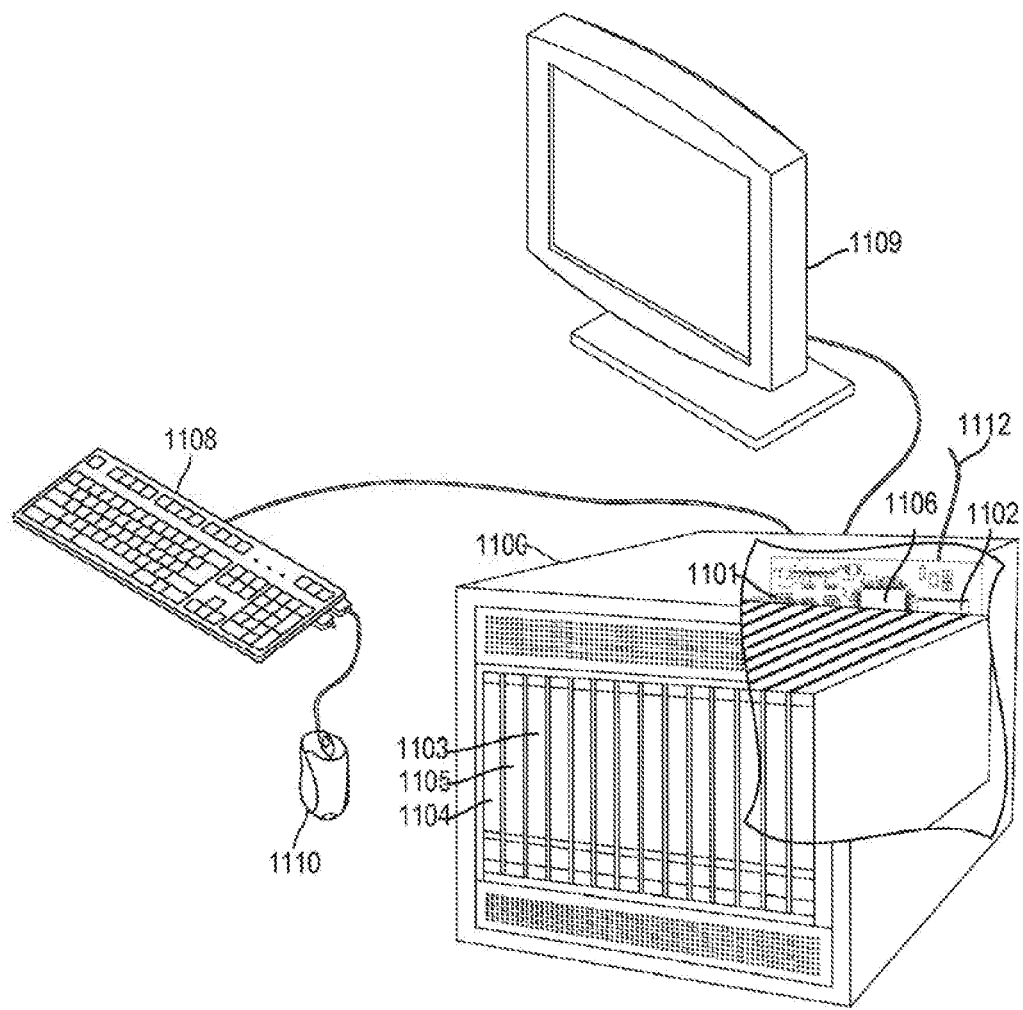
FIG. 13 is a system block diagram of a server device suitable for use with any of the embodiments.

Operations described in the various embodiments, such as the operations assigned to AXN 120, may also be implemented on the on any of a variety of commercially available server devices, such as the server 1100 illustrated in FIG. 13. Such a server 1100 typically includes a processor 1101 coupled to volatile memory 1102 and a large capacity nonvolatile memory, such as a disk drive 1103. The server 1100 may also include an external drive 1105, CD or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001 and 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and or 1103 before they are accessed and loaded into the processors 1001 and 1101. The processor 1001 and 1101 may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the operations and functions described may be implemented in hardware, software, firmware, managed services, or any combination thereof. If implemented in software, the functions may be stored on or transmitted over as one or more instructions or code on a non-transitory computer-readable medium. The operations of a method or algorithm disclosed herein may be embodied in a processor-executable software module, which may be stored on a non-transitory computer-readable medium or processor-readable medium. Non-transitory computer-readable and processor-readable media may be any available storage media that may be accessed by a computer or processor. By way of example, and not limitation, such non-transitory computer-readable media may include RAM, ROM, EEPROM, ED-ROM, or other optical disk storage, magnetic disk storage or other magnetic storage devices, or any other medium that may be used to carry or store desired program code in the form of instructions or data structures and that may be accessed by a computer. Disk and disc, as used herein, includes, but is not limited to, CD, laser disc, optical disc, DVD, floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the present invention. Thus, the present invention is not intended to be limited to the aspects shown herein but is to be accorded the widest scope consistent with the principles and novel features disclosed herein.

What is claimed is:

1. A method for verifying an attribute asserted online comprising:
    establishing, via a processor in an attribute exchange network (AXN) device, relationships with at least one identity provider (IdP) and at least one attribute provider (AP), wherein:
        the at least one IdP is configured to issue credentials;
        the at least one AP is configured to verify attributes; and
        the at least one IdP does not directly interact with the at least one AP;
    receiving, at the AXN device, a verification request from a relying party (RP) computing device, the verification request including information associated with the attribute;
    identifying, by the AXN device and in response to receiving the verification request from the RP computing device, an AP in the at least one AP that is associated with the RP;
    sending, from the AXN device, a request to verify the attribute to a computing device operated by the identified AP;
    receiving, by the AXN device, a claim associated with the attribute, the claim being generated by the computing device operated by the identified AP in response to the identified AP receiving the request to verify the attribute; and
    sending, from the AXN device, the received claim to the RP computing device.

2. The method of claim 1, further comprising associating, by the AXN device, the received claim with a sign on credential asserted by an end user.

3. The method of claim 2, wherein associating the received claim with the sign on credential asserted by the end user comprises associating the received claim with an OpenID credential.

4. The method of claim 1, wherein sending the request to verify the attribute to the computing device operated by the identified AP comprises sending a request message that does not include information identifying the RP to the computing device operated by the identified AP.

5. The method of claim 1, wherein sending the request to verify the attribute to the computing device operated by the identified AP comprises sending a request message that includes information identifying the RP to the computing device operated by the identified AP.

6. An attribute exchange network (AXN) device, comprising:
    a memory; and
    a processor coupled to the memory, wherein the processor is configured with processor-executable instructions to perform operations comprising:
        establishing relationships with at least one identity provider (IdP) and at least one attribute provider (AP), wherein:
            the at least one IdP is configured to issue credentials;
            the at least one AP is configured to verify attributes; and
            the at least one IdP does not directly interact with the at least one AP;
        receiving a verification request from a relying party (RP) computing device, the verifying request including information associated with an attribute;

identifying, in response to receiving the verification request from the RP computing device, an AP in the at least one AP that is associated with the RP;

sending a request to verify the attribute to a computing device operated by the identified AP;

receiving a claim associated with the attribute, the claim being generated by the computing device operated by the identified AP in response to the identified AP receiving the request to verify the attribute; and sending the received claim to the RP computing device.

7. The AXN device of claim 6, wherein the processor is configured with processor executable instructions to perform operations further comprising:

associating the received claim with a sign on credential asserted by an end user.

8. The AXN device of claim 7, wherein the processor is configured with processor executable instructions to perform operations such that associating the received claim with the sign on credential asserted by the end user comprises associating the received claim with an OpenID credential.

9. The AXN device of claim 6, wherein the processor is configured with processor executable instructions to perform operations such that sending the request to verify the attribute to the computing device operated by the identified AP comprises sending a request message that does not include information identifying the RP to the computing device operated by the identified AP.

10. The AXN device of claim 6, wherein the processor is configured with processor executable instructions to perform operations such that sending the request to verify the attribute to the computing device operated by the identified AP comprises sending a request message that includes information identifying the RP to the computing device operated by the identified AP.

11. A non-transitory computer readable storage medium having stored thereon processor executable software instructions configured to cause a processor of an attribute exchange network (AXN) device to perform operations comprising:

establishing relationships with at least one identity provider (IdP) and at least one attribute provider (AP), wherein:
the at least one IdP is configured to issue credentials;
the at least one AP is configured to verify attributes; and
the at least one IdP does not directly interact with the at least one AP;

receiving a verification request from a relying party (RP) computing device, the verification request including information associated with an attribute;

identifying, in response to receiving the verification request from the RP computing device, an AP in the at least one AP that is associated with the RP;

sending a request to verify the attribute to a computing device operated by the identified AP;

receiving a claim associated with the attribute, the claim being generated by the computing device operated by the identified AP in response to the identified AP receiving the request to verify the attribute; and sending the received claim the RP computing device.

12. The non-transitory computer readable storage medium of claim 11, wherein the stored processor-executable instructions are configured to cause the processor of the AXN device to perform operations further comprising:

associating the received claim with a sign on credential asserted by an end user.

13. The non-transitory computer readable storage medium of claim 12, wherein the stored processor-executable instructions are configured to cause the processor of the AXN device to perform operations such that associating the received claim with the sign on credential asserted by the end user comprises associating the received claim with an OpenID credential.

14. The non-transitory computer readable storage medium of claim 11, wherein the stored processor-executable instructions are configured to cause the processor of the AXN device to perform operations such that sending the request to verify the attribute to the computing device operated by the identified one or more APs comprises sending a request message that does not include information identifying the RP to the computing device operated by the identified AP.

15. The non-transitory computer readable storage medium of claim 11, wherein the stored processor-executable instructions are configured to cause the processor of the AXN device to perform operations such that sending the request to verify the attribute to the computing device operated by the identified one or more APs comprises sending a request message that includes information identifying the RP to the computing device operated by the identified AP.

* * * * *